(12) United States Patent
Choi

(10) Patent No.: US 12,736,692 B2
(45) Date of Patent: Sep. 15, 2026

(54) FLEXIBLE DETECTOR AND IMAGING DEVICE INCLUDING THE SAME

(71) Applicant: Vieworks Co., Ltd., Anyang-si (KR)

(72) Inventor: Jungmin Choi, Ansan-si (KR)

(73) Assignee: Vieworks Co., Ltd., Anyang-si (KR)

( * ) Notice: Subject to any disclaimer, the term of this patent is extended or adjusted under 35 U.S.C. 154(b) by 219 days.

(21) Appl. No.: 18/626,940

(22) Filed: Apr. 4, 2024

(65) Prior Publication Data

US 2024/0345270 A1 Oct. 17, 2024

(30) Foreign Application Priority Data

Apr. 14, 2023 (KR) ........................ 10-2023-0049337
Feb. 14, 2024 (KR) ........................ 10-2024-0021042

(51) Int. Cl.

| | |
|---|---|
| ***G01N 23/00*** | (2006.01) |
| ***G01N 23/04*** | (2018.01) |
| ***G01N 23/083*** | (2018.01) |
| ***G01T 1/24*** | (2006.01) |

(52) U.S. Cl.

CPC ............. *G01T 1/244* (2013.01); *G01N 23/04* (2013.01); *G01N 23/083* (2013.01)

(58) Field of Classification Search

CPC ....... G01N 2223/505; G01N 2223/628; G01N 2223/629; G01N 23/083; G01T 1/2002; G01T 1/20185; G01T 1/20189; G01T 1/2019; G01T 1/2928; G01T 1/00

See application file for complete search history.

(56) References Cited

U.S. PATENT DOCUMENTS

| | | | | |
|---|---|---|---|---|
| 10,310,104 | B1 | 6/2019 | Nisius et al. | |
| 11,061,153 | B2 | 7/2021 | Jadrich et al. | |
| 2010/0072379 | A1* | 3/2010 | Nishino ................ | G03B 42/04 250/363.08 |
| 2016/0212864 | A1 | 7/2016 | Lee et al. | |
| 2017/0003401 | A1 | 1/2017 | Konkle et al. | |

FOREIGN PATENT DOCUMENTS

| | | | |
|---|---|---|---|
| CN | 109887940 | A | 6/2019 |
| JP | 2010-078415 | A | 4/2010 |
| JP | 2015225331 | A | 12/2015 |
| JP | 2023030653 | A | 3/2023 |
| JP | 2024-152664 | A | 10/2024 |
| KR | 10-2373241 | B1 | 3/2022 |
| RU | 2244274 | C1 | 1/2005 |
| WO | 2009125632 | A1 | 10/2009 |
| WO | 2023068705 | A1 | 4/2023 |

OTHER PUBLICATIONS

Wulveryck, J, "European Search Report for EP Application No. 24169183.1", Aug. 26, 2024, EPO, Germany.

* cited by examiner

*Primary Examiner* — Dani Fox

(74) *Attorney, Agent, or Firm* — Bridgeway IP Law Group, PLLC; Jihun Kim

(57) ABSTRACT

A flexible detector includes: a panel part including a detection panel configured to detect radiations, and first and second protection panels respectively provided at first and second surface sides of the detection panel, the panel part being configured to be deformable; a main frame part coupled to one side of the panel part; and an end frame part coupled to an end of the other side of the panel part, in which the detection panel, the first protection panel, and the second protection panel extend in a first direction.

13 Claims, 23 Drawing Sheets

(a)

(b)

(a)

(b)

FLEXIBLE DETECTOR AND IMAGING DEVICE INCLUDING THE SAME

CROSS-REFERENCE TO RELATED APPLICATIONS

This application claims priority to and the benefit of Korean Patent Application No. 10-2023-0049337 filed in the Korean Intellectual Property Office on Apr. 14, 2023, and Korean Patent Application No. 10-2024-0021042 filed in the Korean Intellectual Property Office on Feb. 14, 2024, the entire contents of which are incorporated herein by reference.

TECHNICAL FIELD

The present invention relates to a flexible detector and an imaging device including the same. More specifically, the present invention relates to a flexible detector capable of being deformed with respect to an outer peripheral surface of a test target and acquiring a radiographic image, and an imaging device including the same.

BACKGROUND ART

A non-destructive testing method refers to a method that inspects materials, performance, states, whether a defect is present, and the like without destroying test targets. The non-destructive testing method may be used to identify an internal structure or a defect without destroying the test target. For example, the non-destructive testing method may be used to inspect quality of various types of industrial products in industrial sites, identify whether buildings and the like are defective, and identify abrasion/corrosion states.

In case that non-destructive testing is performed by using X-rays among the non-destructive testing methods, a hollow cylindrical object, e.g., a pipe may be a test target. Meanwhile, there is a need for a structure or method capable of easily measuring, without a separate measurement device, a dimension (e.g., a radius or the like) of a test target during non-destructive testing.

A flexible detector may be bent to surround an outer peripheral surface of a test target. However, there may occur a problem in that when the flexible detector is bent, stress is applied between components of the flexible detector, or a tensile force is applied to a radiation detection panel. The radiation detection panel may be damaged by the stress or the tensile force.

In addition, there is a need to prevent external foreign substances such as moisture or dust from being introduced into an X-ray detection panel and electric elements provided in the flexible detector.

DOCUMENT OF RELATED ART

Patent Document

Korean Patent No. 10-2373241

SUMMARY OF THE INVENTION

The present invention has been made in an effort to provide a flexible detector capable of minimizing damage to the flexible detector during a process in which the flexible detector is bent to surround an outer peripheral surface of a test target.

The present invention has also been made in an effort to provide a flexible detector excellent in waterproof and dustproof performance for preventing introduction of external foreign substances such as moisture or dust.

The present invention has also been made in an effort to provide an imaging device including a flexible detector that may be easily replaced and used.

The present invention provides a flexible detector including: a panel part including a detection panel configured to detect radiations, and first and second protection panels respectively provided at first and second surface sides of the detection panel, the panel part being configured to be deformable; a main frame part coupled to one side of the panel part; and an end frame part coupled to an end of the other side of the panel part, in which the detection panel, the first protection panel, and the second protection panel extend in a first direction, in which a slide structure is provided on the end frame part or at an end of the panel part directed toward the end frame part, and in which the slide structure is provided at the end of the first protection panel and configured to support the end of the first protection panel such that the end of the first protection panel is slidable in the first direction or the slide structure is provided at the end of the panel part directed toward the end frame part and configured to support the end of the detection panel such that the end of the detection panel is slidable in the first direction.

In the embodiment, the slide structure may be a first slide structure configured to couple the end of the first protection panel to the end frame part such that the end of the first protection panel is slidable.

In addition, the first slide structure may include a stopper provided at the end of the first protection panel, and the stopper may be guided to slide in the end frame part.

In addition, the stopper may have a slide protrusion, and the end frame part may have a slide guide having a groove shape into which the slide protrusion is inserted and guided.

In addition, the end frame part may include: an end frame main body fixed to the end of the panel part; and an end frame cover coupled to accommodate the stopper between the end frame main body and the end frame cover, and the slide guide may be formed on at least one of an upper surface of the end frame main body and a lower surface of the end frame cover.

In addition, the stopper may be coupled to the end of the first protection panel, a stopper coupling hole, into which the slide protrusion is inserted, may be provided at the end of the first protection panel, and the stopper may be coupled to the end of the first protection panel.

In the embodiment, a maximum movement range of the stopper may be restricted by the first slide structure.

In the embodiment, one side of the first protection panel may be fixed to the main frame part, one side of the second protection panel may be fixed to the main frame part with the panel part interposed therebetween, and the other side of the second protection panel may be fixed to the end frame part.

In the embodiment, the slide structure may include a second slide structure configured to support the end of the detection panel such that the end of the detection panel is slidable in the first direction.

In addition, the second slide structure may include: a slide panel to which the end of the detection panel is coupled; and an inner end frame part provided at the end of the detection panel and configured to support the slide panel such that the slide panel is slidable.

In addition, the panel part may include: the detection panel; first and second inner protection panels respectively provided on the first and second surfaces of the detection panel; and a detection panel part including the inner end frame part.

In addition, the panel part may include: the detection panel part; and a radiation detection part having a protection sheath configured to accommodate the detection panel part.

In the embodiment, the end frame part may be coupled to an end of the protection sheath of the radiation detection part.

In the embodiment, the second slide structure may include a guide protrusion protruding from the inner end frame part, and the inner end frame part, the first inner protection panel, and the second inner protection panel may have slide long holes penetrated by the guide protrusion.

Another embodiment of the present invention provides a flexible detector including: a panel part including a detection panel configured to detect radiations, a radiation detection part having a protection sheath configured to accommodate the detection panel, and first and second protection panels respectively provided at first and second surface sides of the protection sheath, the panel part being configured to be deformable; a main frame part coupled to one side of the panel part; and an end frame part coupled to an end of the other side of the panel part, in which the detection panel, the radiation detection part, the first protection panel, and the second protection panel extend in a first direction, and in which the protection sheath includes a first opening portion formed on a coupling surface coupled to the main frame part and seals and accommodates the detection panel inserted through the first opening portion.

In the embodiment, a first slide structure may be provided on the end frame part and configured to couple an end of the first protection panel to the end frame part such that the end of the first protection panel is slidable in the first direction.

The first slide structure may include a stopper provided at the end of the first protection panel, and the stopper may be guided to slide in the end frame part.

In addition, the end frame part may include: an end frame main body fixed to an end of the protection sheath; and an end frame cover coupled to accommodate the stopper between the end frame main body and the end frame cover, and a protrusion formed on the stopper may be guided by a slide guide formed on at least one of an upper surface of the end frame main body and a lower surface of the end frame cover.

In the embodiment, the radiation detection part may include a detection panel part including the detection panel and the inner end frame part, the detection panel part may have at least one of a first inner protection panel provided on a first surface of the detection panel and a second inner protection panel provided on a second surface of the detection panel, and the detection panel part may be accommodated in the protection sheath.

In the embodiment, a buffer member, which reduces an impact or friction applied to the detection panel, may be provided on at least one of at least one surface of a gate flexible printed circuit board (FPCB) of the detection panel, a gate element configured to connect the gate FPCB and the detection panel, the first inner protection panel, and the second inner protection panel.

In the embodiment, the buffer member may have a stacked structure including a bonding layer and at least one of a cushion layer and a low-friction layer.

In addition, an interval maintaining buffer member, which maintains an interval between the first inner protection panel and the second inner protection panel, may be provided on the first inner protection panel or the second inner protection panel at a lateral side of the detection panel.

In the embodiment, the detection panel part may include a second slide structure provided at an end of the end frame part direction and configured to support the end of the detection panel such that the end of the detection panel is slidable in the first direction.

In the embodiment, one side of the detection panel part may be fixed to the first opening portion of the protection sheath.

In the embodiment, the slide structure may include: a slide panel to which the end of the detection panel is coupled; and an inner end frame part provided at the end of the detection panel and configured to support the slide panel such that the slide panel is slidable.

In the embodiment, the inner end frame part may be fixed to the end frame part.

In the embodiment, an opening formed toward the end frame part may be provided at an end of the protection sheath, a sealing protrusion may protrude around the opening, and the sealing protrusion may be pressed as the inner end frame part is coupled to the end frame part, such that the opening is sealed.

In the embodiment, a second plate of a connection bracket including a first plate coupled to the end frame part may be coupled to the end of the protection sheath, and a gap may be formed between the second plate and the end frame part.

In the embodiment, the protection sheath may have a blade portion protruding to the first surface side to guide a sliding movement of the first protection panel at a lateral side.

In addition, the present invention provides an imaging device, which captures an image while emitting radiations, the imaging device including: the flexible detector; and a main controller provided separately from the flexible detector and connected to the flexible detector through a connection cable.

According to the present invention, the components of the flexible detector, which constitute the stacked structure, may be easily deformed when the flexible detector is deformed, and stress or tensile force to be applied to the flexible detector may be minimized.

In addition, according to the present invention, it is possible to improve the waterproof or dustproof performance of the flexible detector.

In addition, according to the present invention, the flexible detector and the main body part, which is provided for image processing, are separately provided and configured to be connected to each other, such that the flexible detector may be easily replaced and used.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
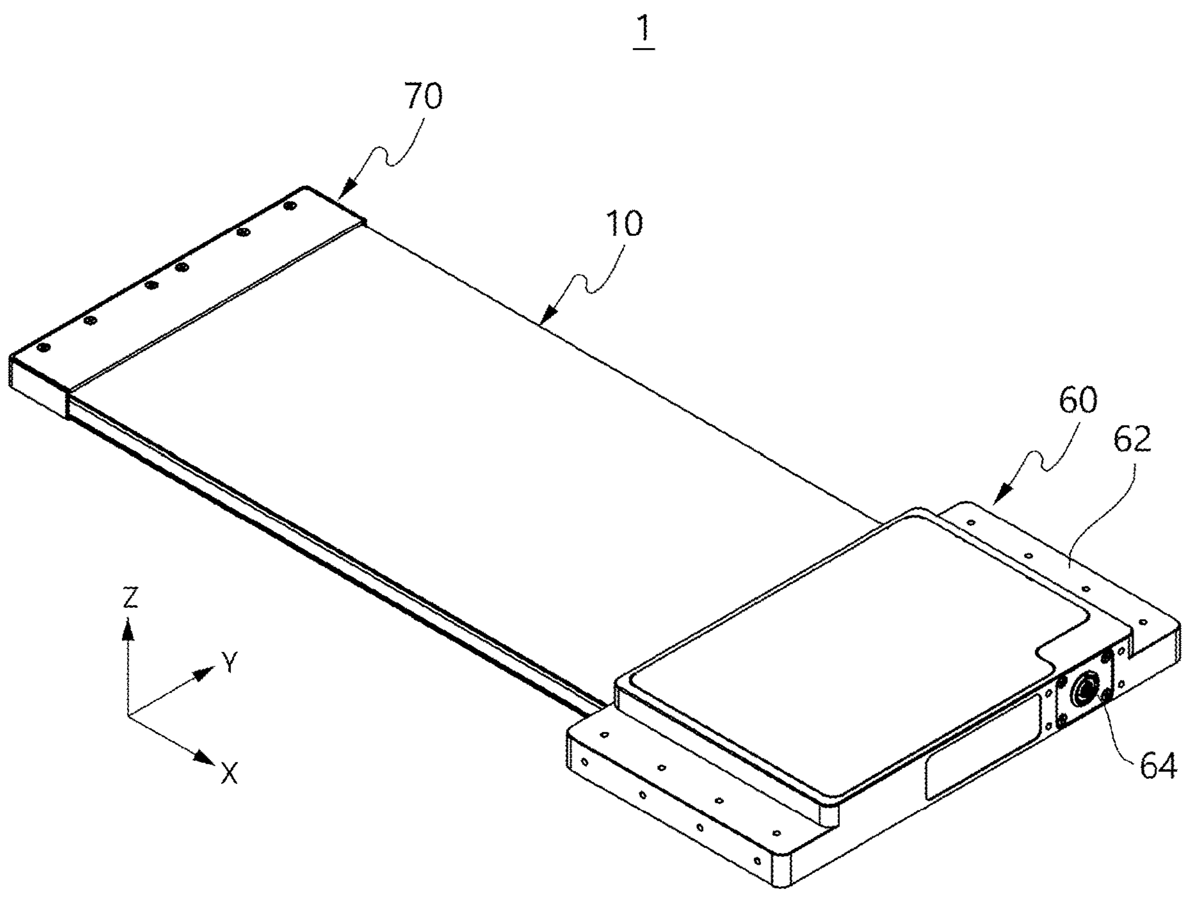
FIG. 1 is a perspective view of a flexible detector according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art. In addition, various embodiments of the present invention to be described below may be combined with one another.

Figure 2:
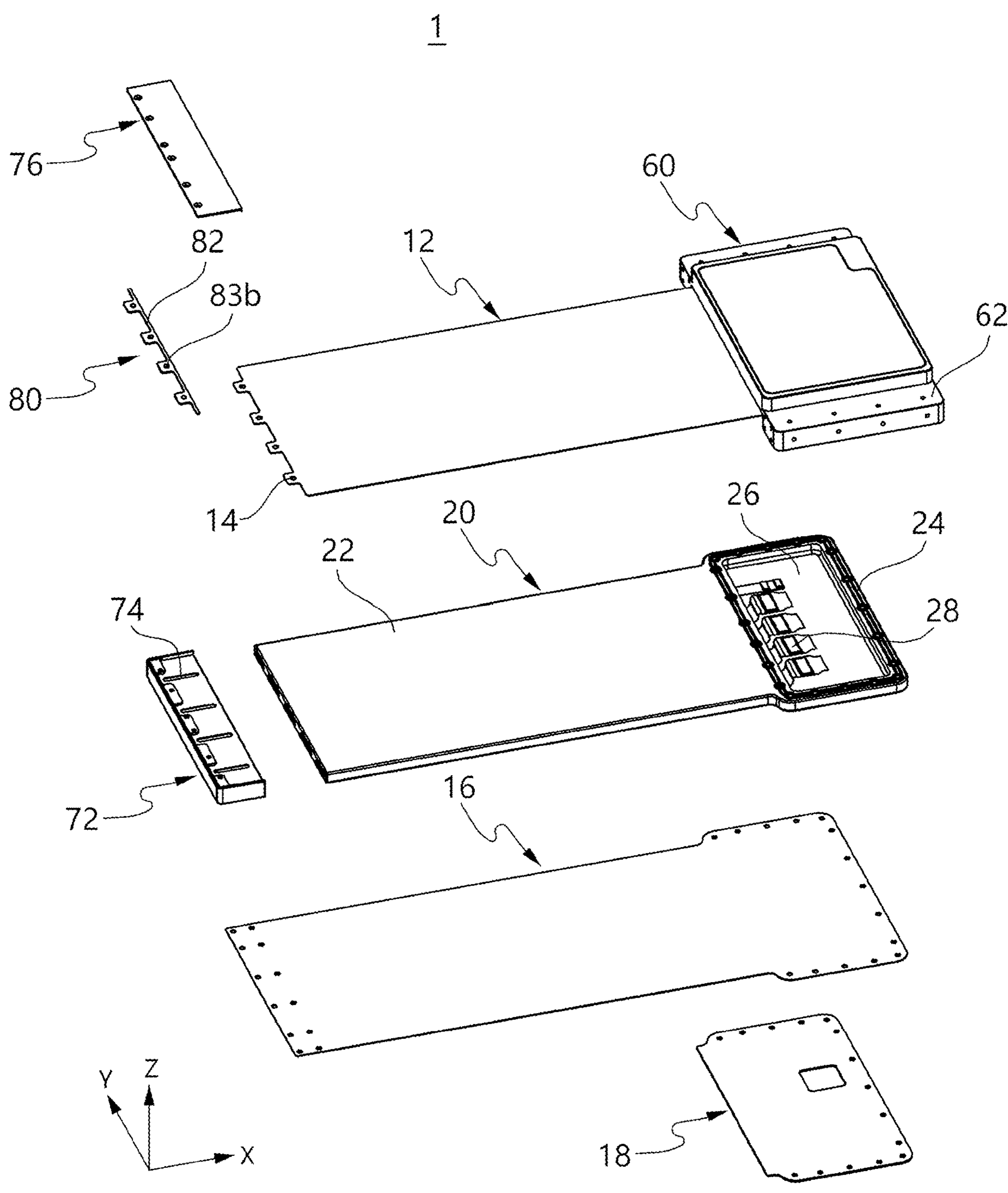
FIGS. 2 and 3 are exploded perspective views of the flexible detector according to the embodiment of the present invention.
Figure 3:
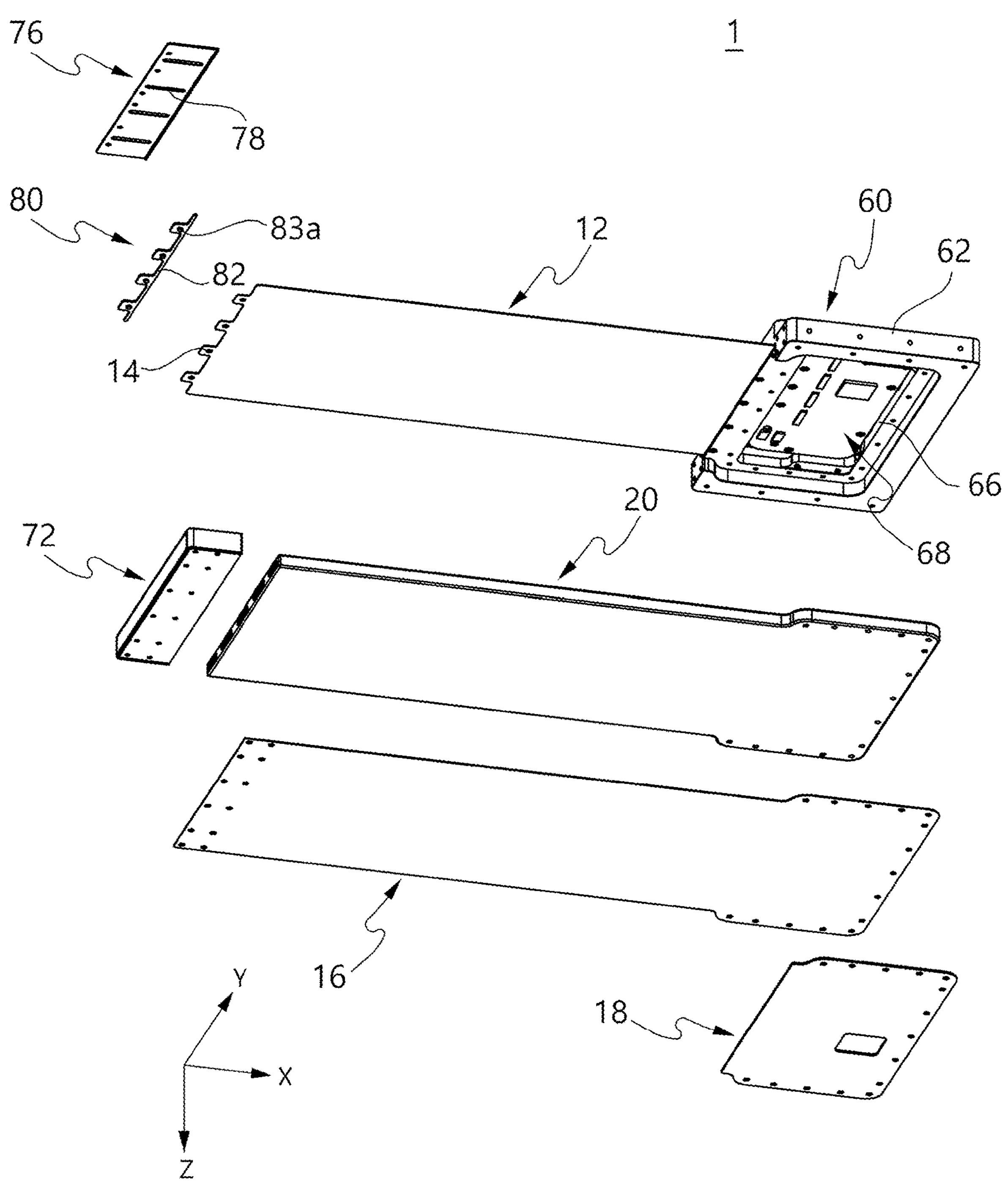
Figure 4:
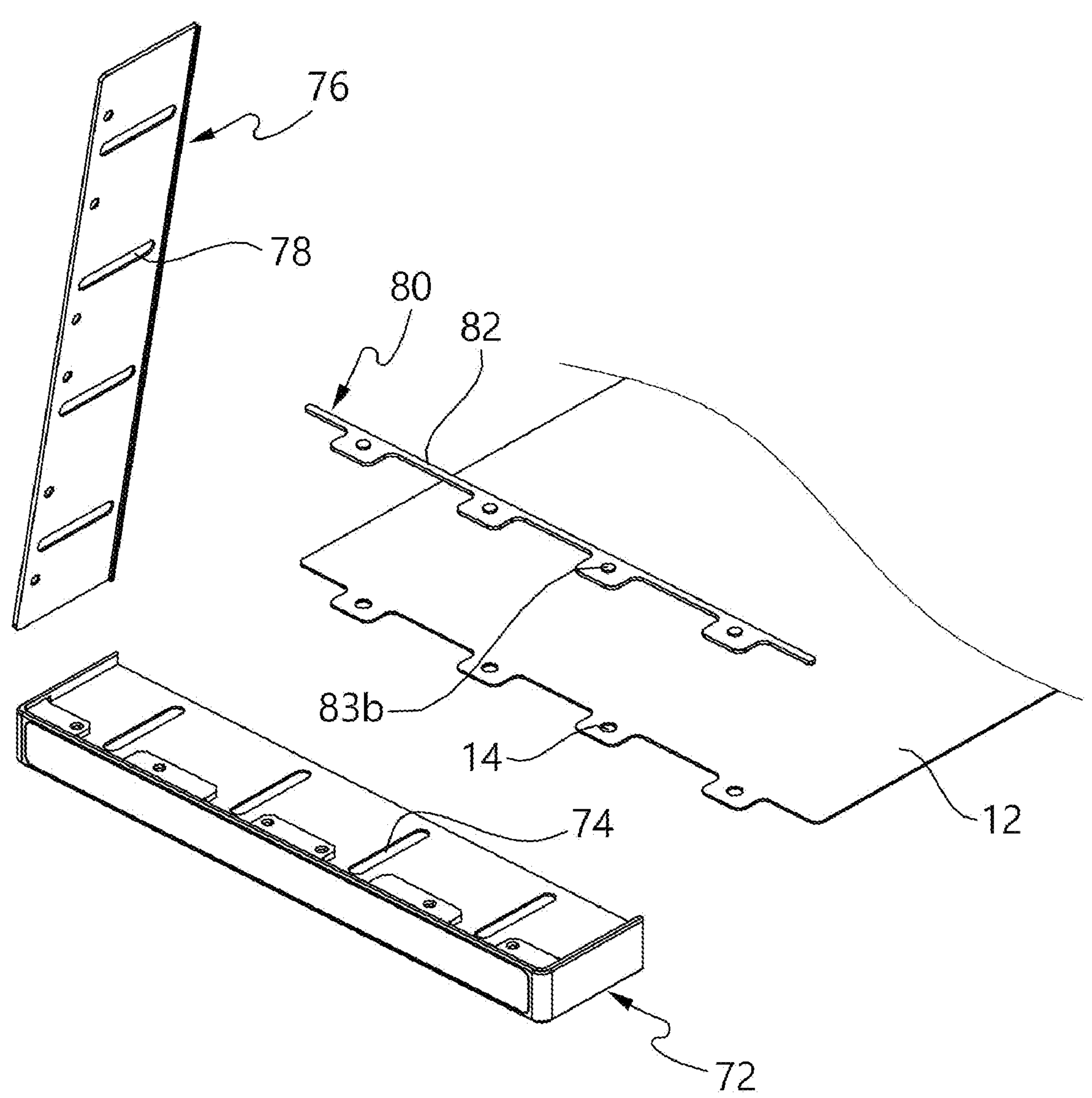
FIG. 4 is a view for explaining a first slide structure of the flexible detector according to the embodiment of the present invention.

FIG. 1 is a perspective view of a flexible detector according to an embodiment of the present invention, and FIGS. 2 and 3 are exploded perspective views of the flexible detector according to the embodiment of the present invention. In addition, FIG. 4 is a view for explaining a first slide structure of the flexible detector according to the embodiment of the present invention.

In the following embodiment, an X-axis direction indicates a first direction (longitudinal direction), a Y-axis direction indicates a second direction (width direction) perpendicular to the first direction, and a Z-axis direction indicates a vertical direction (thickness direction) perpendicular to both the first and second directions. In addition, an X-Y plane defined by the X-axis and the Y-axis indicates a horizontal plane, and an X-Z plane defined by the X-axis and the Z-axis indicates a vertical plane.

With reference to FIG. 1, a flexible detector 1 according to an embodiment of the present invention includes a flexible panel part 10, a main frame part 60 coupled to one side of the panel part 10, and an end frame part 70 coupled to the other end of the panel part 10.

The panel part 10 may be configured by stacking a plurality of panels and bent to surround an outer peripheral surface of a test target. A radiation detection part 20 capable of detecting radiations is provided in the panel part 10.

The main frame part 60 includes a housing 62 made of an inelastic material or a material higher in rigidity than a material of the panel part 10. An electronic element and a circuit may be provided in the housing 62 to control the radiation detection part 20. In addition, the main frame part 60 may further include a connection port 64 electrically connected to or configured to perform communication with other devices.

The end frame part 70 is disposed to be opposite to the main frame part 60 and coupled to the panel part 10. The end frame part 70 may be made of an inelastic material or a material higher in rigidity than the material of the panel part 10.

FIGS. 2 and 3 illustrate detailed configurations and coupling configurations of the panel part 10, the main frame part 60, and the end frame part 70. With reference to FIGS. 2 and 3, the components may be coupled by using screws or a bonding agent. It is noted that because the method of coupling the components is a typical means, a detailed description of means, such as the use of screws or bonding agents for coupling the components, will be omitted in the present invention, unless specifically described.

The panel part 10 may include the radiation detection part 20, and first and second protection panels 12 and 16 respectively provided on first and second surfaces of the radiation detection part 20. In the embodiment, one side of the first protection panel 12 may be fixed to the main frame part 60, and one side of the second protection panel 16 may be fixed to the main frame part 60 with the radiation detection part 20 interposed therebetween.

The radiation detection part 20 may include a detection panel part 30 including a detection panel 32 therein. In the embodiment, the radiation detection part 20 may include a protection sheath 22 provided to surround the detection panel part 30. The protection sheath 22 may be made of a flexible material and serve as a housing that accommodates the detection panel part 30. The protection sheath 22 may be made of rubber, urethane, silicone, carbon composite materials, plastic, or the like that may transmit radiations and be changeable in shape. In the embodiment, the protection sheath may be made of a silicone rubber. Because the detection panel 32 disposed in the protection sheath 22 is surrounded by the protection sheath 22, which may improve the waterproof and dustproof performance.

With reference to FIG. 2, a coupling portion 24 may be provided at one side of the radiation detection part 20 and have a first surface side coupled to the main frame part 60. In the embodiment, the coupling portion 24 may include a first opening portion 26, and terminals 28 of the detection panel 32 may be exposed through the first opening portion 26.

In the embodiment, the other portions of the protection sheath 22, except for the first opening portion 26, may be configured to be directly and indirectly sealed. The detection panel 32 may be accommodated in the protection sheath 22 and protected from moisture, dust, or the like.

The first protection panel 12 and the second protection panel 16 may be positioned on an upper surface (first surface) and a lower surface (second surface) of the radiation detection part 20 and made of rubber, urethane, silicone, carbon composite materials, plastic, or the like that may transmit radiations and be changeable in shape. In the embodiment, the first protection panel 12 and the second protection panel 16 may be made of carbon fiber reinforced plastic (CFRP). An example is described in which the second protection panel 16 is coupled to the lower surface of the radiation detection part. However, the second protection panel 16 may be attached to a lower surface of the protection sheath 22 of the radiation detection part 20 by using a bonding agent, a double-sided tape, or the like. In addition, in some instances, the protection sheath 22 and the second protection panel 16 may be manufactured as a single coupled body by including the second protection panel 16 in one side surface of the protection sheath 22 by insert-injection molding when the protection sheath 22 is manufactured by injection molding.

The main frame part 60 may include the housing 62 and a control module 68 embedded in the housing 62. The control module 68 may include an electronic element and a circuit that serve to control the detection panel 32 and/or process a detection signal from the detection panel 32. In the embodiment, the control module 68 may be configured as a printed board assembly (PBA).

With reference to FIG. 3, the main frame part 60 may include a second opening portion 66 provided in a bottom surface thereof and communicate with the first opening portion 26 of the radiation detection part 20 through the second opening portion 66. In the embodiment, the terminal 28 of the detection panel 32 provided on the radiation detection part 20 may be connected to the control module 68 through the first opening portion 26 and the second opening portion 66. However, in the embodiment of the present invention, the radiation detection part 20 and the main frame part 60 do not necessarily need to have the first opening portion and the second opening portion, and the detection panel part may be connected to the control module 68 of the main frame part 60 through a separate connector.

The end frame part 70 is coupled to an end of the radiation detection part 20. The end frame part 70 may be bonded to the end of the radiation detection part 20 by a bonding agent or fixed to the end of the radiation detection part 20 by using a fixing screw. A first slide structure to be described below is formed on the end frame part 70.

One side of the first protection panel 12 is coupled to the housing of the main frame part 60, and the other side of the first protection panel 12 is coupled to the end frame part 70. The other side of the first protection panel 12 is coupled to the end frame part 70 while defining the first slide structure, such that an end of the first protection panel 12 may slide within a predetermined range through the first slide structure when the panel part 10 is deformed.

With reference to FIGS. 2 to 4, the first slide structure may be configured by the end frame part 70 and a stopper 80.

The end frame part 70 includes an end frame main body 72 and an end frame cover 76. The end frame main body 72 may be coupled to the end of the radiation detection part 20, and the end frame cover 76 may be coupled to a first surface of the end frame main body 72. The end frame main body 72 and the end frame cover 76 are coupled so that a space is formed therebetween. The stopper 80 is slidably coupled between the end frame main body 72 and the end frame cover 76.

First slide guides 74 are formed in an upper surface of the end frame main body 72 and each have a groove shape extending in the X-axis direction, and second slide guides 78 are formed in a bottom surface of the end frame cover 76 and each have a groove shape extending in the X-axis direction.

The stopper 80 includes a stopper main body 82 and slide protrusions **83*a* and 83*b* formed on the stopper main body 82 in the Z-axis direction. The first slide protrusion 83*a* may be inserted into the first slide guide 74, and the second slide protrusion 83***b* may be inserted into the second slide guide 78.

One of the first slide protrusion 83*a* and the second slide protrusion 83*b* is inserted into a stopper coupling hole 14 of the first protection panel 12, such that the end of the first protection panel 12 may be slidably coupled to the end frame part 70.

In the embodiment of the present invention, only one of the first slide guide 74 and the second slide guide 78 may be provided, and only one of the first slide protrusion 83*a* and the second slide protrusion 83*b* may be provided to correspond to the slide guide.

The slide protrusions 83*a* and 83*b* of the stopper 80 may slide in the X-axis direction while being guided by the slide guides 74 and 78. The stopper 80 slides in the space between the end frame main body 72 and the end frame cover 76. A limit position or distance by which the stopper 80 may slide is set, such that a maximally allowable bending degree of the flexible detector 1 is restricted.

Meanwhile, FIGS. 2 to 4 illustrate the example in which the stopper 80 is configured separately from the first protection panel 12. However, in the embodiment of the present invention, the stopper 80 may be integrated with the first protection panel 12. In addition, the stopper 80 may, of course, be variously modified and carried out as long as the stopper 80 is structured to restrict a maximum bending degree of the first protection panel 12.

The second protection panel 16 is coupled to a second surface side of the radiation detection part 20. One side of the second protection panel 16 is coupled to a lower side of the housing 62 of the main frame part 60 by means of the radiation detection part 20. The other side of the second protection panel 16 is coupled to the end frame part 70.

One end of the first protection panel 12 is fixed to the housing 62 of the main frame part 60, and the other end of the first protection panel 12 is slidably coupled to the end frame part 70 by the first slide structure. Meanwhile, two opposite ends of the second protection panel 16 are fixed to the end frame part 70 and the lower side of the housing 62 of the main frame part 60. With this configuration, in case that the panel part 10 is bent, the two opposite ends of the second protection panel 16 do not slide, and one end of the first protection panel 12 may be slid by the first slide structure. However, in the embodiment of the present invention, the first slide structure may, of course, be provided for the second protection panel 16 or the two opposite ends of the first protection panel 12 may be fixed and the first slide structure may be formed on the second protection panel 16.

Meanwhile, because the second protection panel 16 is made of a flexible material, an auxiliary panel 18, which is made of an inelastic material or a material higher in rigidity than the material of the second protection panel 16, may be further provided outside the second protection panel 16 when one end of the second protection panel 16 is fixed to the housing of the main frame part 60.

The drawings illustrate that the radiation detection part 20, the main frame part 60, the first protection panel 12, the second protection panel 16, and the end frame part 70 are coupled by screws. However, these components may be coupled by using a bonding agent.

Figure 5:
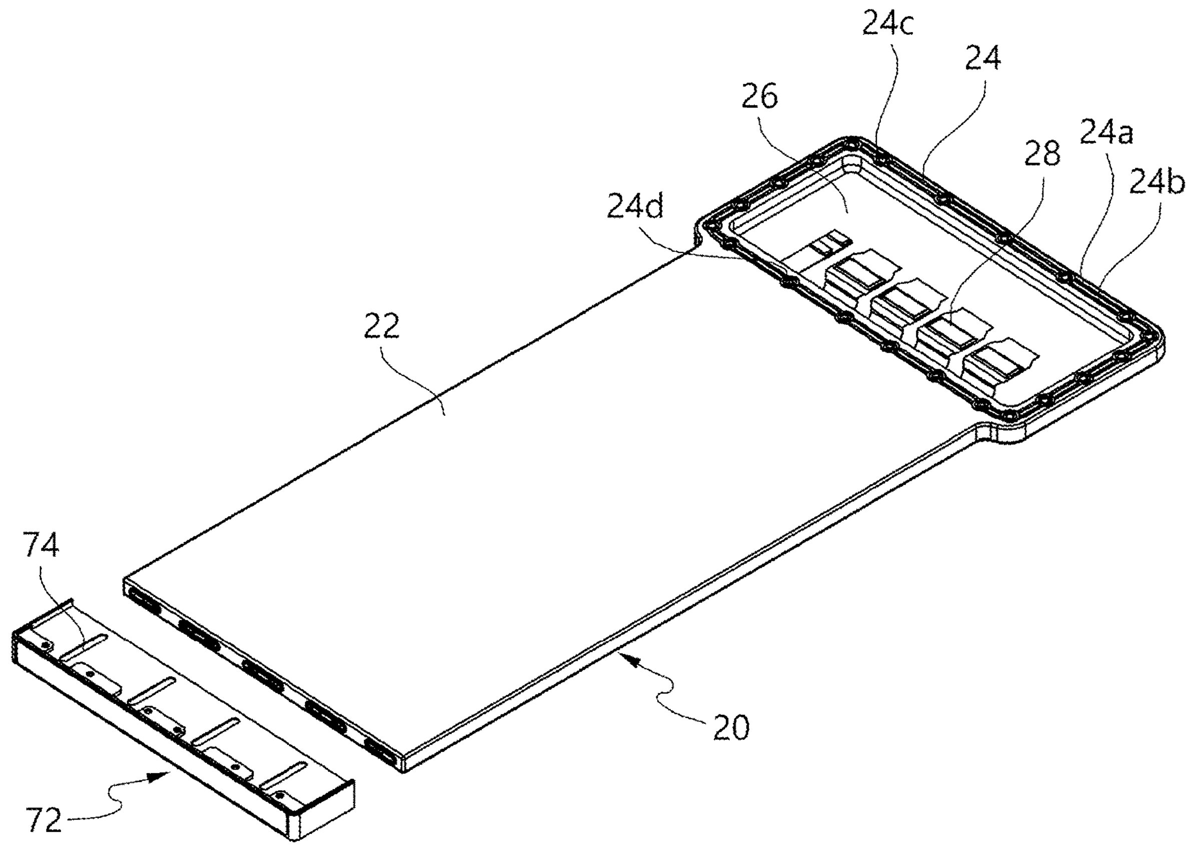
FIG. 5 is a view illustrating a state in which a radiation detection part and an end frame of the flexible detector according to the embodiment of the present invention are disassembled.
Figure 6:
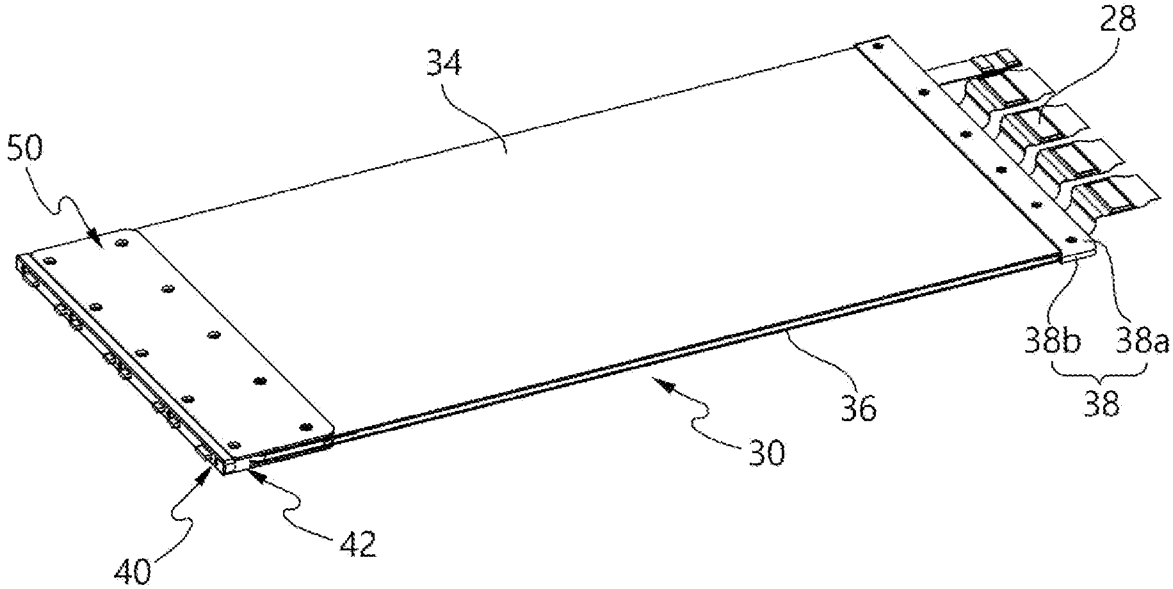
FIG. 6 is a perspective view of a detection panel part of the flexible detector according to the embodiment of the present invention in a state in which a protection sheath is removed from the radiation detection part.

FIG. 5 is a view illustrating a state in which a radiation detection part and an end frame of the flexible detector according to the embodiment of the present invention are disassembled, and FIG. 6 is a perspective view of a detection panel part of the flexible detector according to the embodiment of the present invention in a state in which a protection sheath is removed from the radiation detection part. In addition, FIG. 7 is an exploded perspective view of the detection panel part of the flexible detector according to the embodiment of the present invention.

As described above, the radiation detection part 20 illustrated in FIG. 5 includes the protection sheath 22, and the end frame main body 72 of the end frame part 70 is coupled to the end of the radiation detection part 20. As described above, the detection panel part 30 is inserted into the protection sheath 22, and the protection sheath 22 has the first opening portion 26 through which the terminals 28 of the detection panel 32 are exposed. Waterproof protrusions 24*a* and 24*b* may be formed on the coupling portion 24, which surrounds the first opening portion 26, in order to improve the waterproof performance. The waterproof protrusions 24*a* and 24*b* may be provided as a plurality of waterproof protrusions including first and second waterproof protrusions 24*a* and 24*b* shaped to surround the first opening portion 26. In addition, threaded holes 24*c* are formed in the coupling portion 24 of the first opening portion 26, such that the coupling portion 24 may be coupled to the bottom surface of the housing 62. In addition, fixing rod insertion holes 24*d* may be provided in a part of the coupling portion 24. One end of the detection panel part 30 may be fixed by means of the fixing rod insertion hole 24*d*. In the embodiment, a fixing rod protrudes from a first coupling piece 38*a* to be described below. As the fixing rod is inserted into the fixing rod insertion hole 24*d*, one side of the detection panel part 30 may be fixed in the vicinity of the first opening portion 26 of the protection sheath 22.

Figure 7:
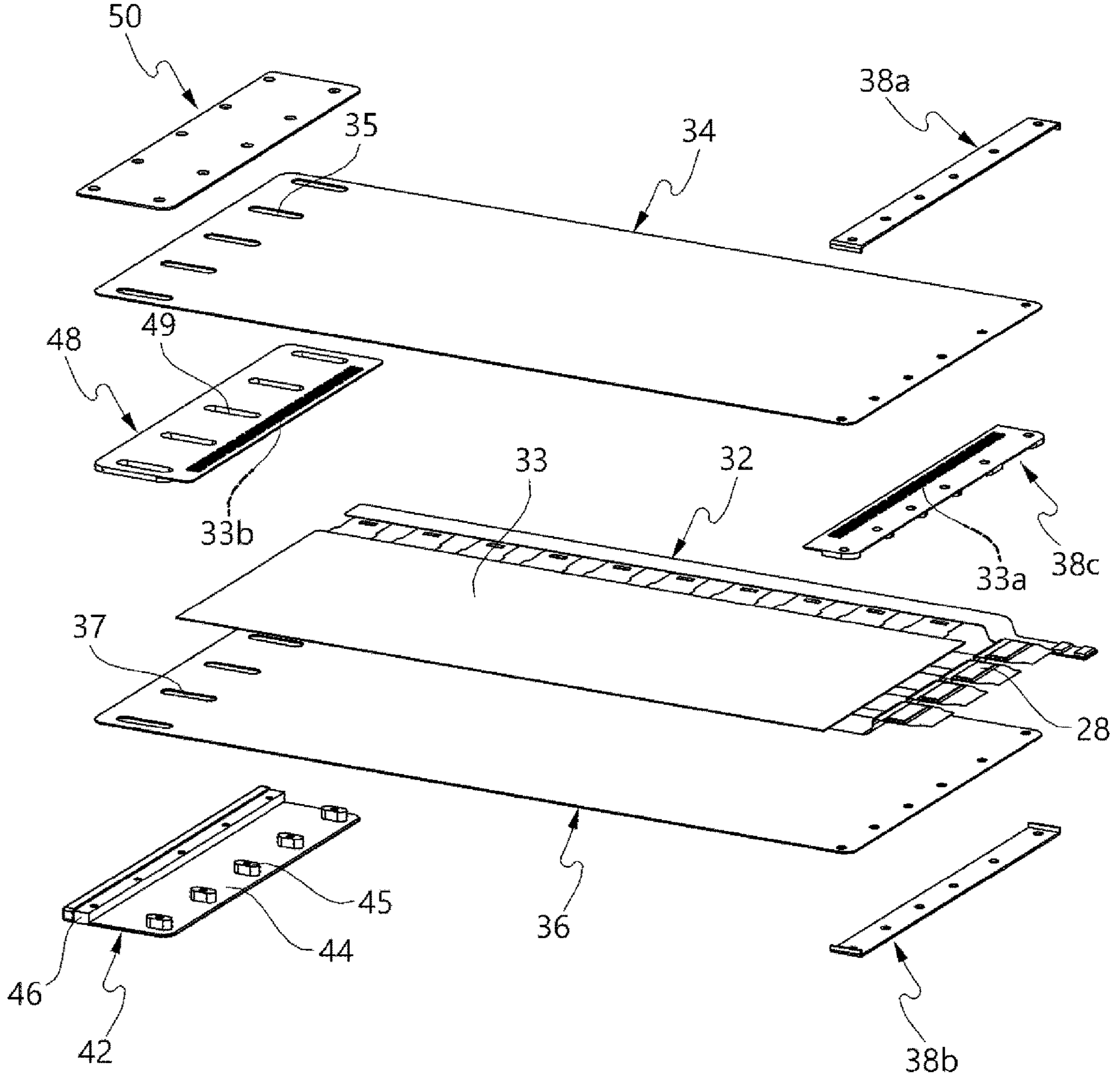
FIG. 7 is an exploded perspective view of the detection panel part of the flexible detector according to the embodiment of the present invention.

With reference to FIGS. 6 and 7, the detection panel part 30 is provided in the protection sheath 22 of the radiation detection part 20. The detection panel part 30 includes the detection panel 32 and first and second inner protection panels 34 and 36 respectively provided on first and second surfaces of the detection panel 32. In addition, coupling pieces 38, which are coupled to upper and lower portions of the first and second inner protection panels 34 and 36, are provided at one end of the detection panel part 30, and an inner end frame part 40 is provided at the other end of the detection panel part 30.

The detection panel 32 may be made of a flexible material. For example, the detection panel 32 may include a flexible thin film transistor (TFT) 33 and obtain image information by converting light, which is emitted from the fluorescent material, into electric signals (electric charges) in response to radiations that penetrate the test target.

The detection panel 32 may include a readout IC (ROIC) sensor provided in the form of a chip-on-film (COF), and a gate sensor. The ROIC sensor and the gate sensor may each be made of a flexible material or have a flexible structure.

The first and second inner protection panels 34 and 36 may be made of a radioactive permeable flexible material. The first and second inner protection panels 34 and 36 may serve to protect the detection panel 32.

The coupling piece 38 may include the first coupling piece 38*a* and a second coupling piece 38*b*. One side of the detection panel part 30 may be assembled by coupling the first coupling piece 38*a* and the second coupling piece 38*b* by using screws or the like. In addition, a third coupling piece 38*c* may be provided between the first coupling piece 38*a* and the second coupling piece 38*b*. In the embodiment, the third coupling piece 38*c* may be positioned between the first and second inner protection panels 34 and 36.

The inner end frame part 40 may include an inner end frame main body 42 and an inner end frame cover 50. The inner end frame main body 42 includes a plate 44 from which guide protrusions 45 protrude, and a wall portion 46 formed at a lateral portion of the plate 44. The inner end frame cover 50 may be coupled to an inner frame main body 42 by being coupled to an upper portion of the wall portion 46 and upper portions of the guide protrusion 45 by screws. The inner end frame part 40 is provided at the end of the detection panel part 30 at a side of the end frame part 70.

A slide panel 48 may be provided between the inner end frame main body 42 and the inner end frame cover 50. In the embodiment, one side of the detection panel 32 may be fixed to the third coupling piece 38*c* by means of a first fixing portion 33*a*, and the other side of the detection panel 32 may be fixed to the slide panel 48 by means of a second fixing portion 33*b*. The first and second fixing portions 33*a* and 33*b* may be formed by using a bonding agent or a bonding film.

First and second slide long holes 35 and 37 are respectively formed in the first and second inner protection panels 34 and 36, and third slide long holes 49 are formed in the slide panel 48. The guide protrusion 45 formed on the inner end frame main body 42 is inserted into the second slide long hole 37 formed in the second inner protection panel 36, the third slide long hole 49 formed in the slide panel 48, and the first slide long hole 35 formed in the first inner protection panel 34. The configuration constitutes a second slide structure (the second slide structure is also referred to as an "inner slide structure" in the present invention). The ends of the first and second inner protection panels 34 and 36 slide in the state in which the guide protrusions 45 are inserted into the first and second slide long holes 35 and 37 when the detection panel part 30 is bent. In addition, because the end of the detection panel 32 is fixed to the slide panel 48, the detection panel 32 may slide in the X-axis direction as the slide panel 48 slides in the state in which the guide protrusions 45 are inserted into the third slide long holes 49 of the slide panel 48 when the detection panel part 30 is bent.

An operation of the slide structure provided on the flexible detector 1 when the flexible detector 1 according to the present invention is bent with respect to the test target will be described.

Figure 8:
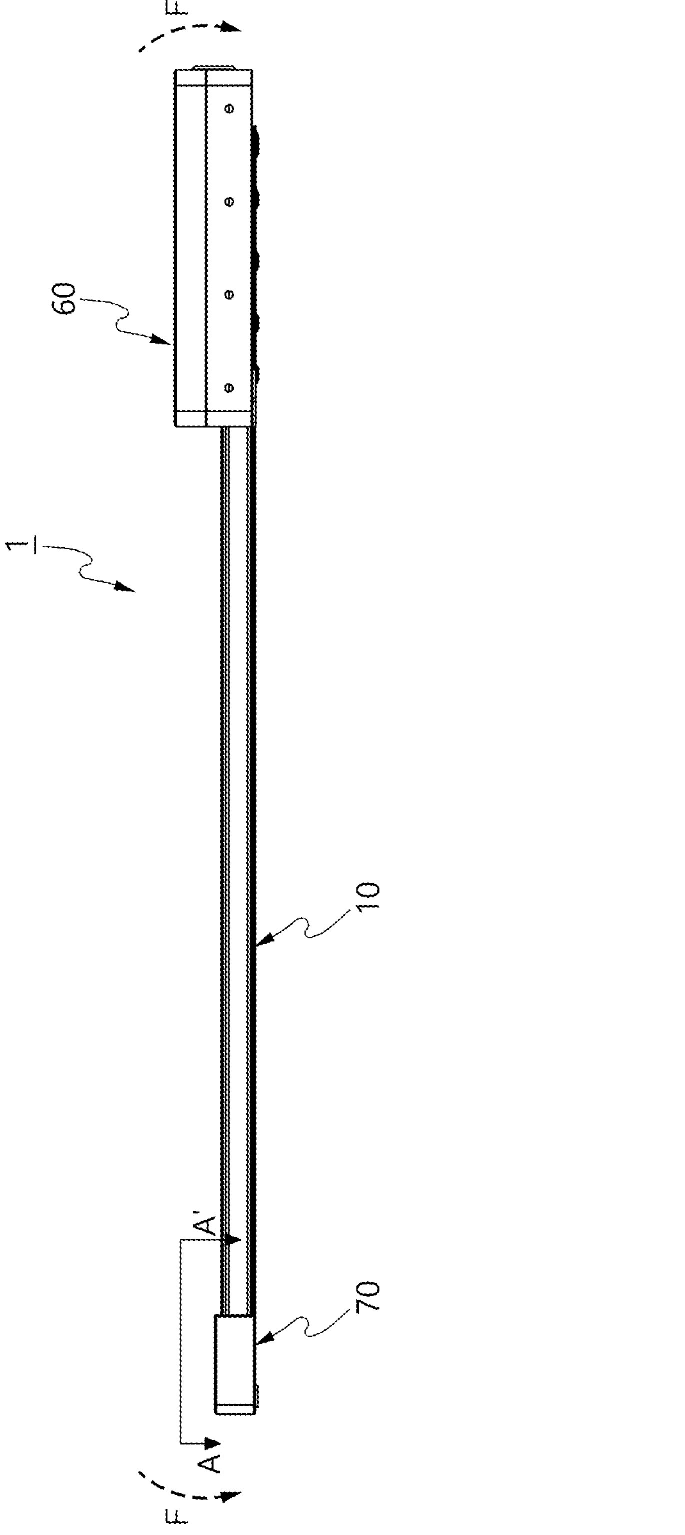
FIG. 8 is a side view of the flexible detector according to the embodiment of the present invention.
Figure 9:
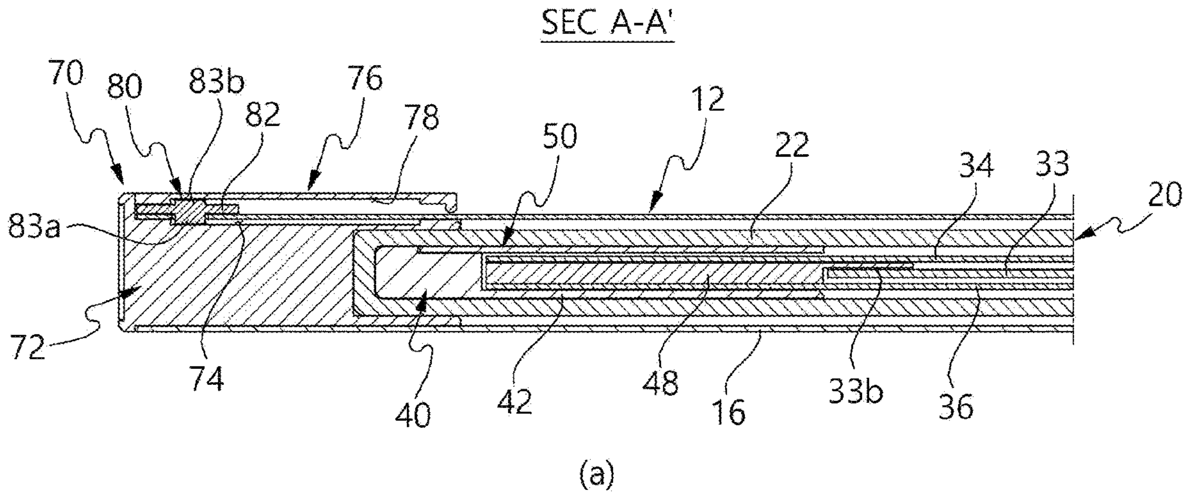
FIG. 9 is a cross-sectional view (cross-section taken along line A-A' in FIG. 8) illustrating an operating state of a slide structure in accordance with a bent state of the flexible detector according to the embodiment of the present invention.
Figure 9:
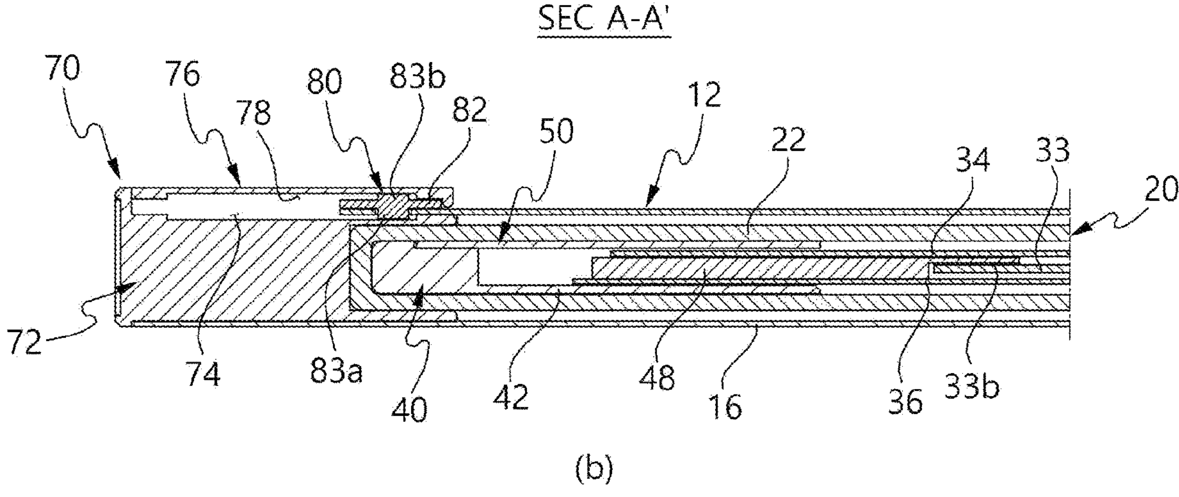

FIG. 8 is a side view of the flexible detector according to the embodiment of the present invention, and FIG. 9 is a cross-sectional view (cross-section taken along line A-A' in FIG. 8) illustrating an operating state of a slide structure in accordance with a bent state of the flexible detector according to the embodiment of the present invention.

The flexible detector 1 is bent when forces indicated by F in FIG. 8 are applied to the flexible detector 1. Part (a) of FIG. 9 illustrates a state in which the flexible detector 1 is not bent, and part (b) of FIG. 9 illustrates a state in which the flexible detector 1 is bent.

As illustrated in part (a) of FIG. 9, when the flexible detector 1 is not bent, the stopper 80 coupled to the end of the first protection panel 12 is positioned at a neutral position in the state in which the slide protrusions 83*a* and 83*b* are inserted into the slide guides 74 and 78 formed in the end frame main body 72 and the end frame cover 76. In addition, the slide panel 48, to which the end of the detection panel 32 is fixed, and the ends of the first and second inner protection panels 34 and 36 are positioned at neutral positions in the space between the inner end frame main body 42 of the inner end frame part 40 and the inner end frame cover 50. The guide protrusions 45 protruding from the end frame main body 42 are inserted into the slide long holes 49, 35, and 37 respectively formed in the slide panel 48 and the first and second inner protection panels 34 and 36. In this case, the neutral positions may be understood as positions of the stopper 80, the slide panel 48, and the ends of the first and second inner protection panels 34 and 36 in the state in which the flexible detector 1 is not bent.

As illustrated in part (b) of FIG. 9, when the flexible detector 1 is bent, the stopper 80, which is coupled to the end of the first protection panel 12, moves to a first position in the state in which the slide protrusions 83*a* and 83*b* are inserted into the slide guides 74 and 78 formed in the end frame main body 72 and the end frame cover 76. The movement position of the stopper 80 is determined depending on a bending degree of the flexible detector 1, and a maximum movement distance is restricted by the slide guides 74 and 78 (i.e., there is a limit point of the first position). Because the maximum movement distance of the stopper 80 is restricted, the flexible detector 1 is prevented from being excessively deformed. In addition, the slide panel 48, to which the end of the detection panel 32 is fixed, and the ends of the first and second inner protection panels 34 and 36 are moved to the first positions from the space between the inner end frame main body 42 of the inner end frame part 40 and the inner end frame cover 50. In this case, the first positions may be understood as positions of the stopper 80, the slide panel 48, and the ends of the first and second inner protection panels 34 and 36 in the state in which the flexible detector 1 is bent.

With this slide structure, it is possible to minimize a tensile force applied to the detection panel 32 when the flexible detector 1 is bent.

Figure 10:
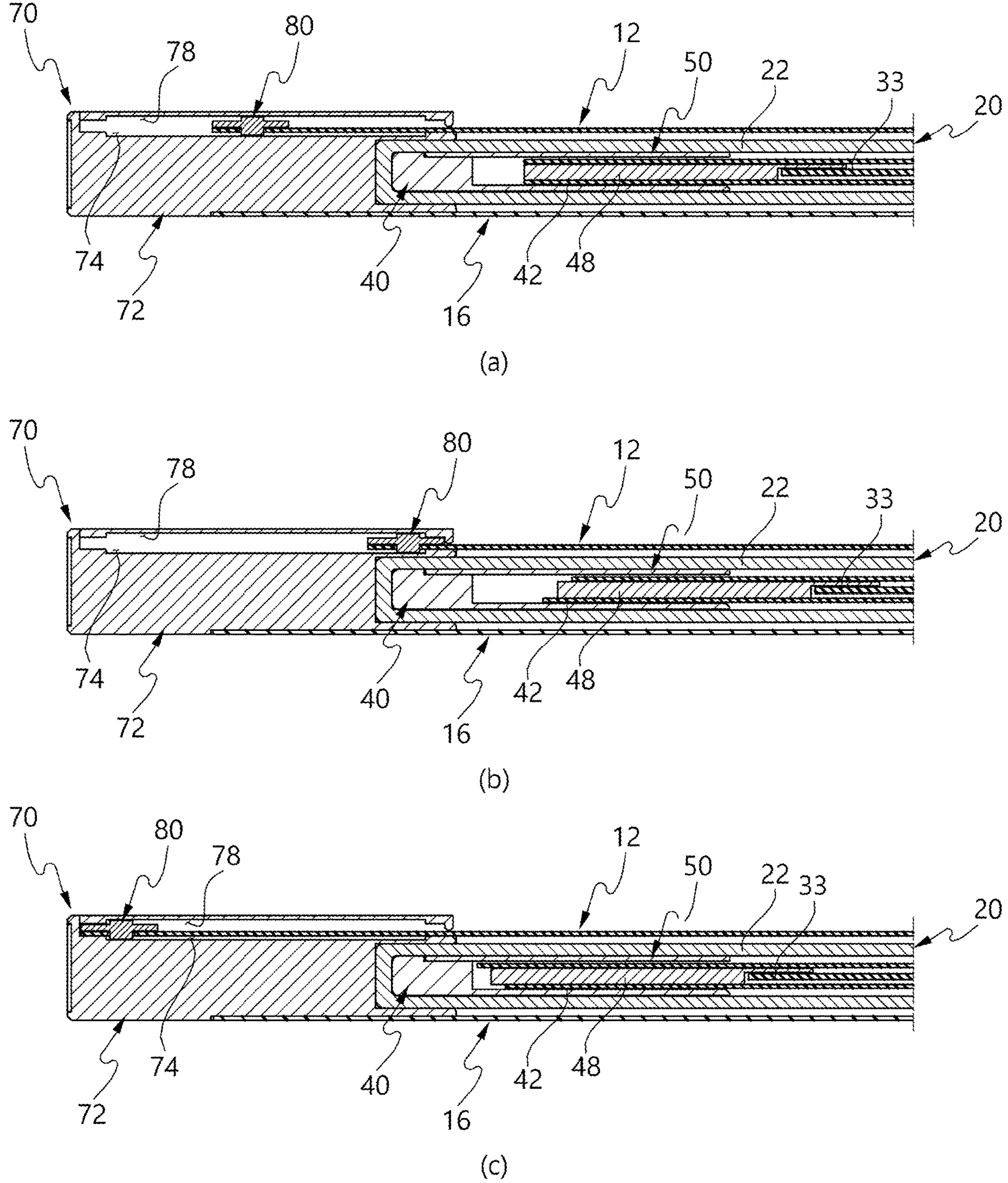
FIG. 10 is a cross-sectional view (cross-section taken along line A-A' in FIG. 8) illustrating another embodiment of the slide structure in accordance with the bent state of the flexible detector according to the embodiment of the present invention.

FIG. 10 is a cross-sectional view (cross-section taken along line A-A' in FIG. 8) illustrating another embodiment of the slide structure in accordance with the bent state of the flexible detector according to the embodiment of the present invention.

FIG. 10 differs from FIG. 9 in that lengths of the slide guides 74 and 78 formed on the end frame main body 72 and the end frame cover 76 in FIG. 10 are further increased leftward than that in FIG. 9, and the other components are identical to one another.

Part (a) of FIG. 10 illustrates a state in which the flexible detector 1 is not bent, part (b) of FIG. 10 illustrates a state in which the flexible detector 1 is bent as a force is applied as illustrated in FIG. 8, and part (c) of FIG. 10 illustrates a state in which the flexible detector 1 is bent in a direction opposite to the direction illustrated in part (b) of FIG. 10 as a force is applied in a direction opposite to the direction of the force illustrated in FIG. 8.

In FIG. 10, the position of the stopper 80 may be a neutral position in part (a) of FIG. 10, a first position in part (b) of FIG. 10, and a second position in part (c) of FIG. 10. The flexible detector 1 in FIG. 10 is configured to be bent in two directions without being bent only in one direction, unlike the flexible detector 1 in FIG. 9. The first position in part (b) of FIG. 10 is set to restrict maximum bending when the flexible detector 1 is bent toward the second protection panel 16, and the second position in part (c) of FIG. 10 is set to restrict maximum bending when the flexible detector 1 is bent toward the first protection panel 12. Because the maximum movement distance of the stopper 80 is restricted, the excessive deformation of the flexible detector 1 in the two directions is restricted.

Meanwhile, in part (b) and part (c) of FIG. 10, it can be ascertained that the slide panel 48, to which the end of the detection panel 32 is fixed, and the ends of the first and second inner protection panels 34 and 36 slide as the flexible detector 1 is bent.

Figure 11:
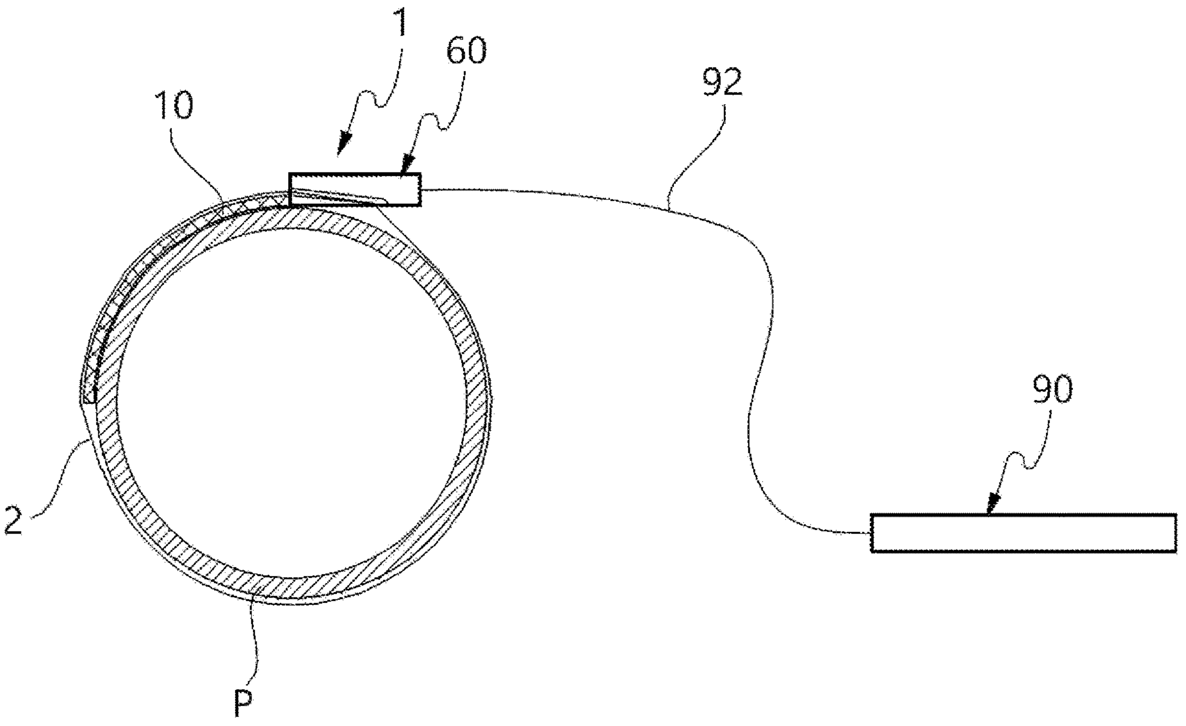
FIG. 11 is a view schematically illustrating an imaging device including the flexible detector according to the embodiment of the present invention.
Figure 12:
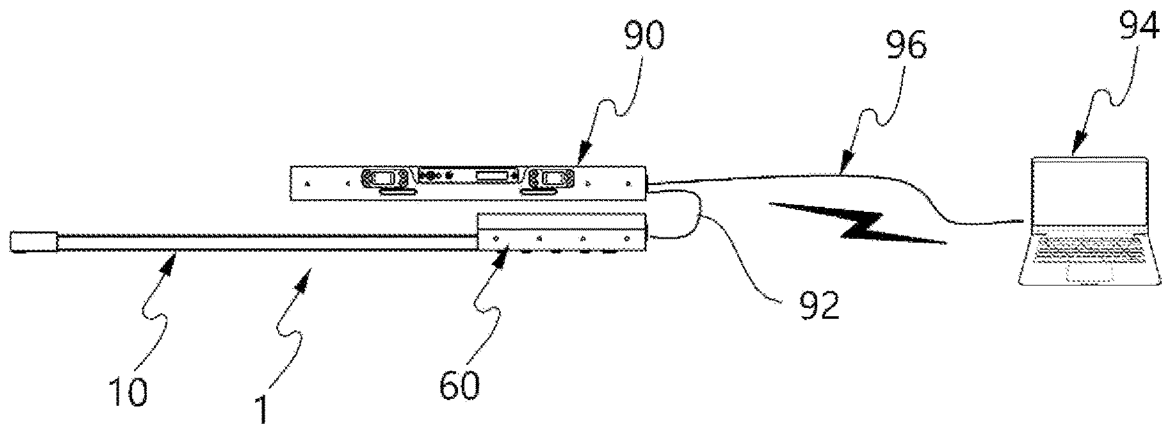
FIG. 12 is a view exemplarily illustrating a system configuration of the imaging device including the flexible detector according to the embodiment of the present invention.

FIG. 11 is a view schematically illustrating an imaging device including the flexible detector according to the embodiment of the present invention, and FIG. 12 is a view exemplarily illustrating a system configuration of the imaging device including the flexible detector according to the embodiment of the present invention.

With reference to FIG. 11, the flexible detector 1 may be mounted along an outer peripheral surface of the test target P. In order to fix the flexible detector 1 to the outer peripheral surface of the test target P, a fixing part 2 configured as a band, a strip, a wire, a belt, a ratchet belt, an iron chain, a Velcro fastener, and the like may be used. When a non-destructive test is performed on the test target P by using the flexible detector 1, a non-illustrated radiation generation part may be provided inside or outside the test target P.

In the embodiment, the main frame part 60 may be connected to a main controller 90 through a connection cable 92. The main controller 90 may transmit a control signal to the flexible detector 1 and receive and store or process radiographic images acquired by the flexible detector 1.

The main controller 90 may be provided separately from the flexible detector 1, which may reduce the weight and/or size of the flexible detector 1. In addition, when the main controller 90 is separately provided, the radiation exposure to the main controller 90 may be reduced, which may improve the durability.

Because the flexible detector 1 and the main controller 90 are connected through the connection cable 92, the flexible detector 1 may be easily replaced and connected to the main controller 90, as necessary.

With reference to FIG. 12, the main controller 90 may be connected to a server 94 or the like in a wireless manner or through a wired cable 96.

Figure 13:
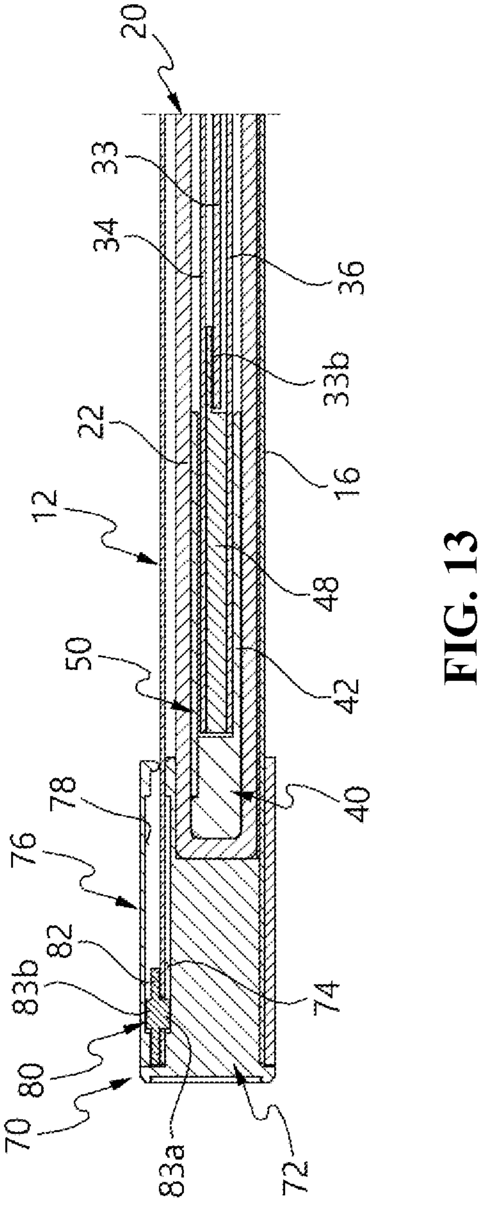
FIG. 13 is a cross-sectional view of another embodiment of the flexible detector according to the embodiment of the present invention.

Meanwhile, FIG. 13 is a cross-sectional view of another embodiment of the flexible detector according to the embodiment of the present invention.

In comparison with FIG. 9, the flexible detector 1 in FIG. 13 is provided in the state in which the second protection panel 16 is tightly attached to the protection sheath 22 of the radiation detection part 20. The second protection panel 16 may be attached to one side surface of the protection sheath 22 by using a bonding agent. Alternatively, the protection sheath 22 may be formed in a state of being attached to the second protection panel 16 by dual injection molding when the protection sheath 22 is manufactured by injection molding. In the case of the embodiment illustrated in FIG. 13, it is possible to prevent foreign substances from being introduced between the second protection panel 16 and the protection sheath 22.

Figure 14:
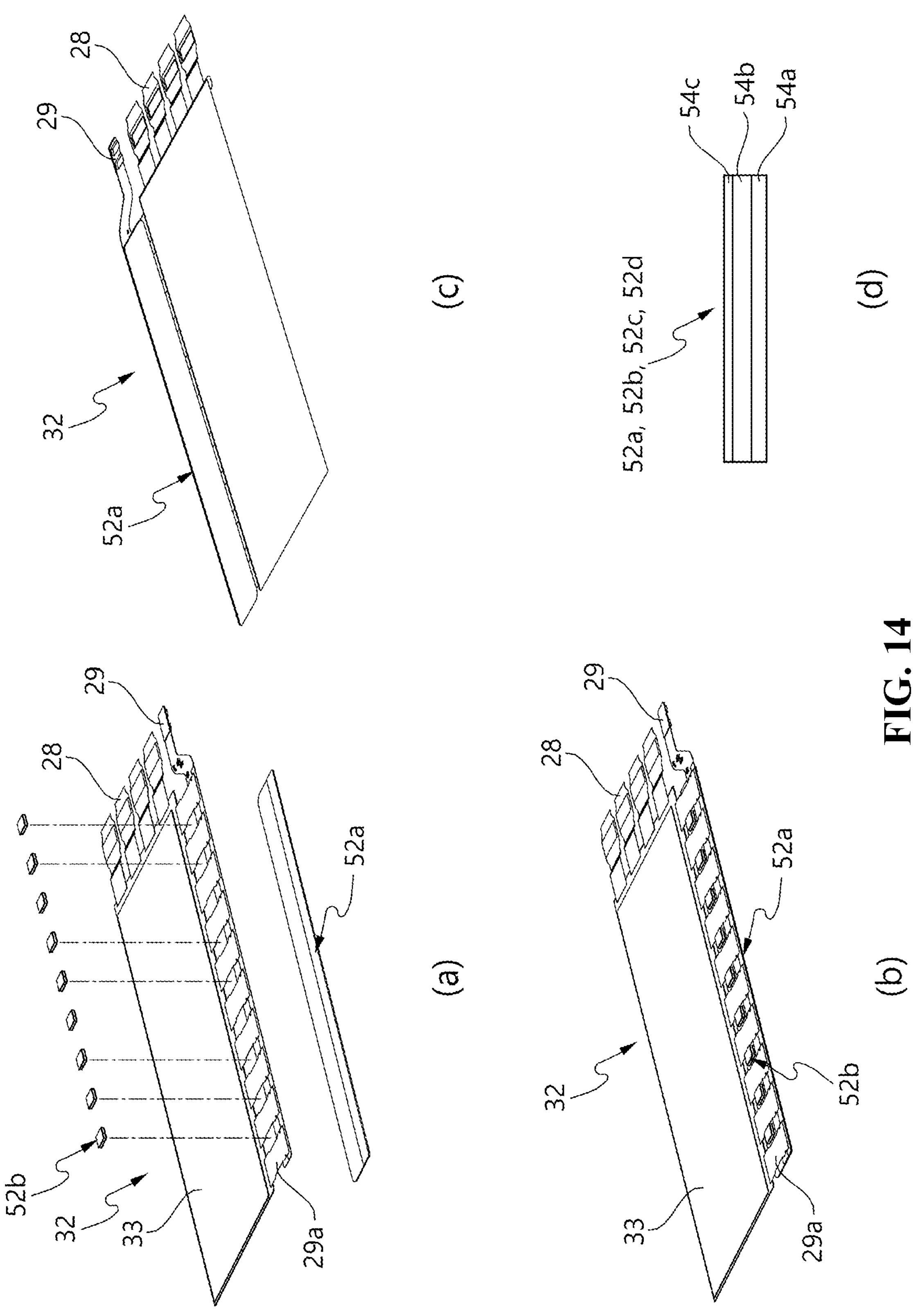
FIG. 14 is a view illustrating another embodiment of the detection panel part of the flexible detector according to the embodiment of the present invention and illustrating a configuration in which a buffer member is provided on the detection panel.
Figure 15:
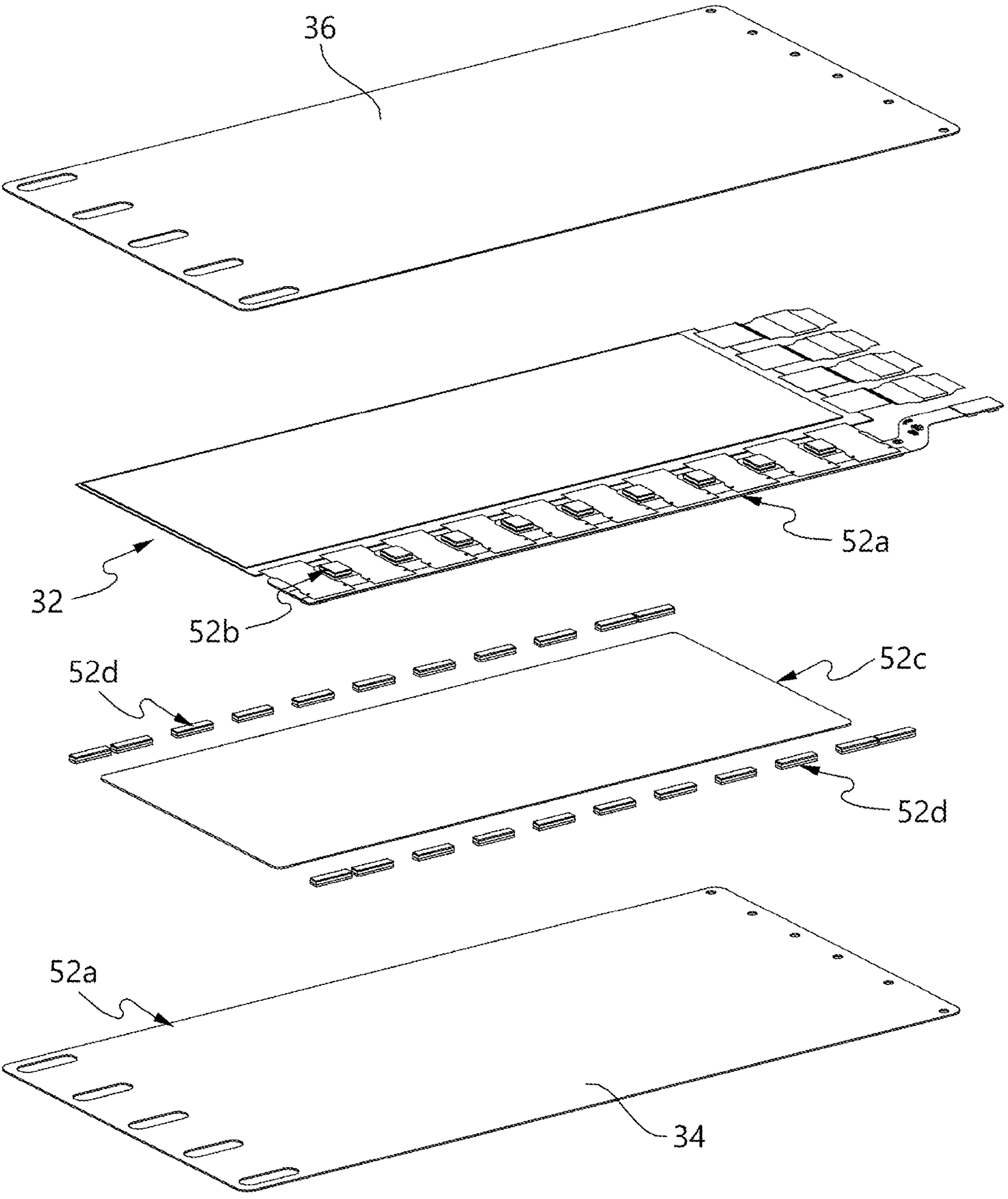
FIG. 15 is a view illustrating another embodiment of the detection panel part of the flexible detector according to the embodiment of the present invention and illustrating a configuration in which a buffer member is additionally provided between first and second inner protection panels.
Figure 16:
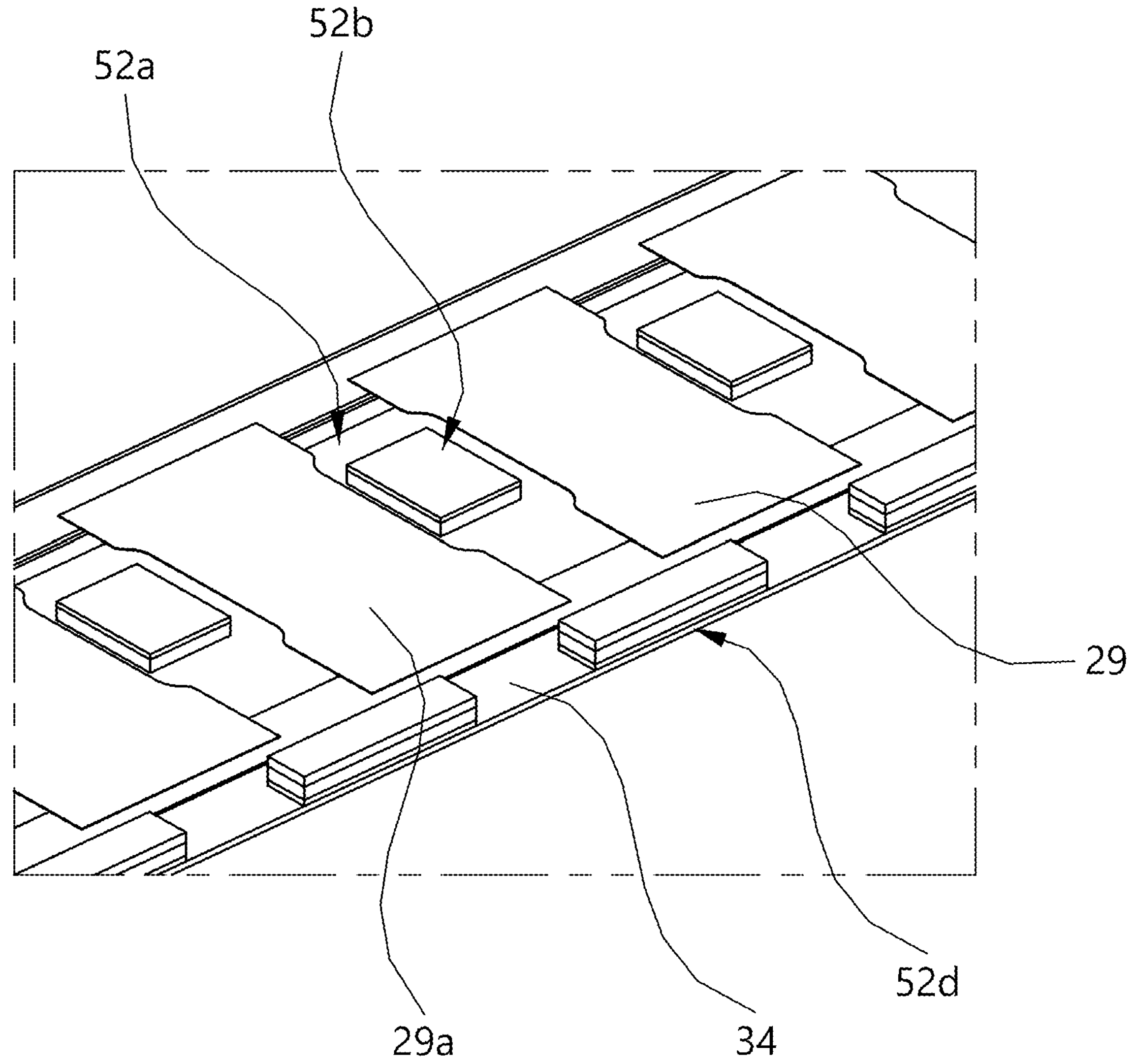
FIG. 16 is a view illustrating another embodiment of the detection panel part of the flexible detector according to the embodiment of the present invention and illustrating an enlarged view of the buffer member provided on the detection panel part.

FIG. 14 is a view illustrating another embodiment of the detection panel part of the flexible detector according to the embodiment of the present invention and illustrating a configuration in which a buffer member is provided on the detection panel. FIG. 15 is a view illustrating another embodiment of the detection panel part of the flexible detector according to the embodiment of the present invention and illustrating a configuration in which a buffer member is additionally provided between first and second inner protection panels. FIG. 16 is a view illustrating another embodiment of the detection panel part of the flexible detector according to the embodiment of the present invention and illustrating an enlarged view of the buffer member provided on the detection panel part.

Part (a) of FIG. 14 is an exploded perspective view illustrating a state in which a first buffer member 52*a* and second buffer members 52*b* are being attached to the detection panel 32, part (b) of FIG. 14 is a view illustrating a state in which the first buffer member 52*a* and the second buffer members 52*b* are attached to the detection panel 32, part (c) of FIG. 14 is a view illustrating a rear side of part (b) of FIG. 14, and part (d) of FIG. 14 is a cross-sectional view illustrating a stacked structure of the buffer members.

With reference to FIG. 14, the detection panel 32 may include the flexible TFT 33 and detect X-rays. In the embodiment, the detection panel 32 is equipped with the terminal 28 including an ROIC, a gate flexible printed circuit board (FPCB) 29, and a gate element 29*a* connected to the gate FPCB 29 and the flexible TFT 33. The gate element may be provided as a gate COF (chip-on-flex/film). Meanwhile, unlike the configuration illustrated in FIG. 14, the FPCB 29 and the gate element 29*a* of the detection panel 32 may be positioned at different sides in a longitudinal direction of the detection panel 32.

In the present invention, when the flexible detector 1 is bent, the detection panel 32 slides in the X-axis direction between the first and second inner protection panels 34 and 36. In order to mitigate physical friction or impact applied to the detection panel 32, the first buffer member 52*a* may be attached along one side surface of the gate FPCB 29 of the detection panel 32, and the second buffer member 52*b* may be attached between a plurality of gate elements 29*a* on a surface opposite to the first buffer member 52*a*.

As illustrated in part (d) of FIG. 14, the first buffer member 52*a*, the second buffer member 52*b*, and third and fourth buffer members 52*c* and 52*d* to be described below may each include a bonding layer 54*a*, a cushion layer 54*b*, and a low-friction layer 54*c*. The bonding layer 54*a* is a layer to be bonded to another member. The cushion layer 54*b* is a layer that serves to perform a buffer function while being elastically deformed. The low-friction layer 54*c* is a layer that reduces friction during the sliding movement. The low-friction layer 54*c* may be made of a material with a small surface frictional coefficient. For example, a sheet made of resin such as polycarbonate may be used as the low-friction layer 54*c*. Meanwhile, in case that the first buffer member 52*a*, the second buffer member 52*b*, the third buffer member 52*c*, and the fourth buffer member 52*d* mainly serve to absorb or mitigate the impact, the low-friction layer 54*c* may be excluded, and only the bonding layer 54*a* and the cushion layer 54*b* may be provided.

With reference to FIG. 15, the third buffer member 52*c* may be provided on the first inner protection panel 34. The third buffer member 52*c* may be formed to have a size corresponding to the flexible TFT 33 of the detection panel 32. The third buffer member 52*c* is bonded to the first inner protection panel 34, and the low-friction layer 54*c* of the third buffer member 52*c* is directed toward the detection panel 32. FIG. 15 illustrates that the third buffer member 52*c* is provided on the first inner protection panel 34. However, the third buffer member 52*c* may be attached to the second inner protection panel 36. In addition, the fourth buffer members 52*d* may be further provided to maintain an interval between the first inner protection panel 34 and the second inner protection panel 36 and perform the buffer function. The fourth buffer members 52*d* may be attached to any one of the first inner protection panel 34 and the second inner protection panel 36. In the present invention, the fourth buffer member 52*d* is also called an 'interval maintaining buffer member'.

With reference to FIG. 16, it is possible to identify the state in which the first buffer member 52*a*, the second buffer members 52*b*, and the fourth buffer members 52*d* are attached. In the embodiment, the second buffer members 52*b* may be attached to one surface of the first buffer member 52*a*. Because the fourth buffer members 52*d* maintain the interval between the first inner protection panel 34 and the second inner protection panel 36, the fourth buffer member 52*d* has a larger thickness than the other buffer members 52*a*, 52*b*, and 52*c*.

Figure 17:
FIG. 17 is a perspective view of a flexible detector according to another embodiment of the present invention.
Figure 17:
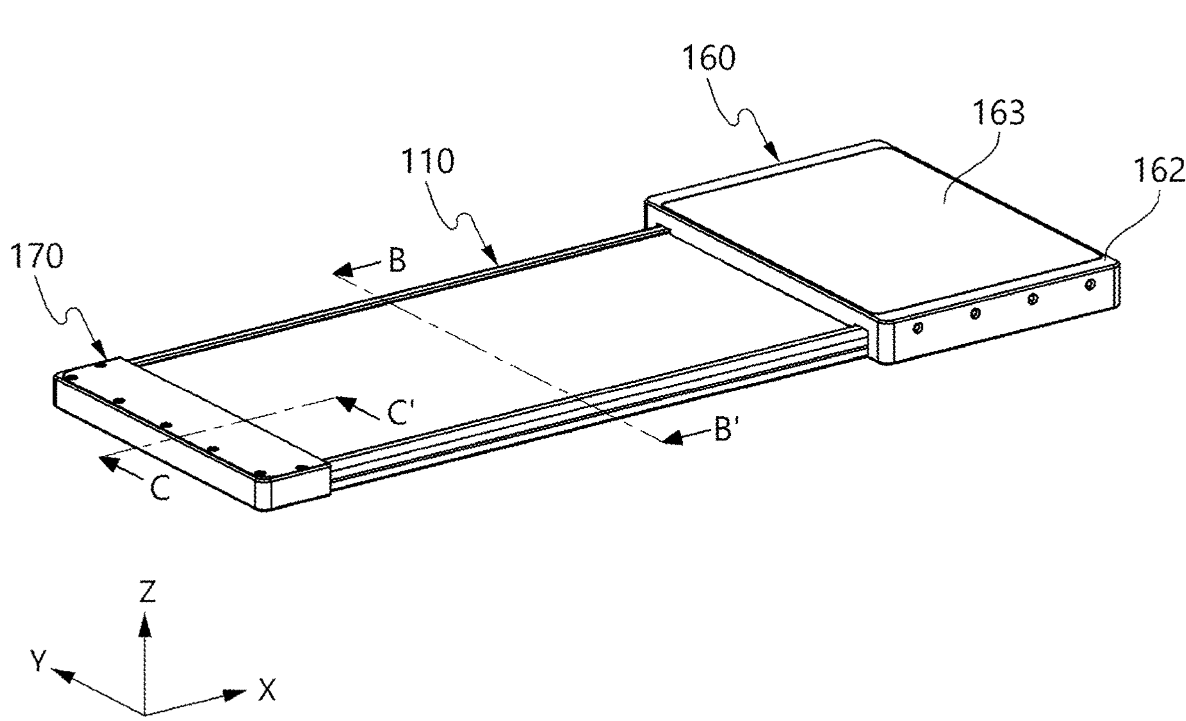
Figure 18:
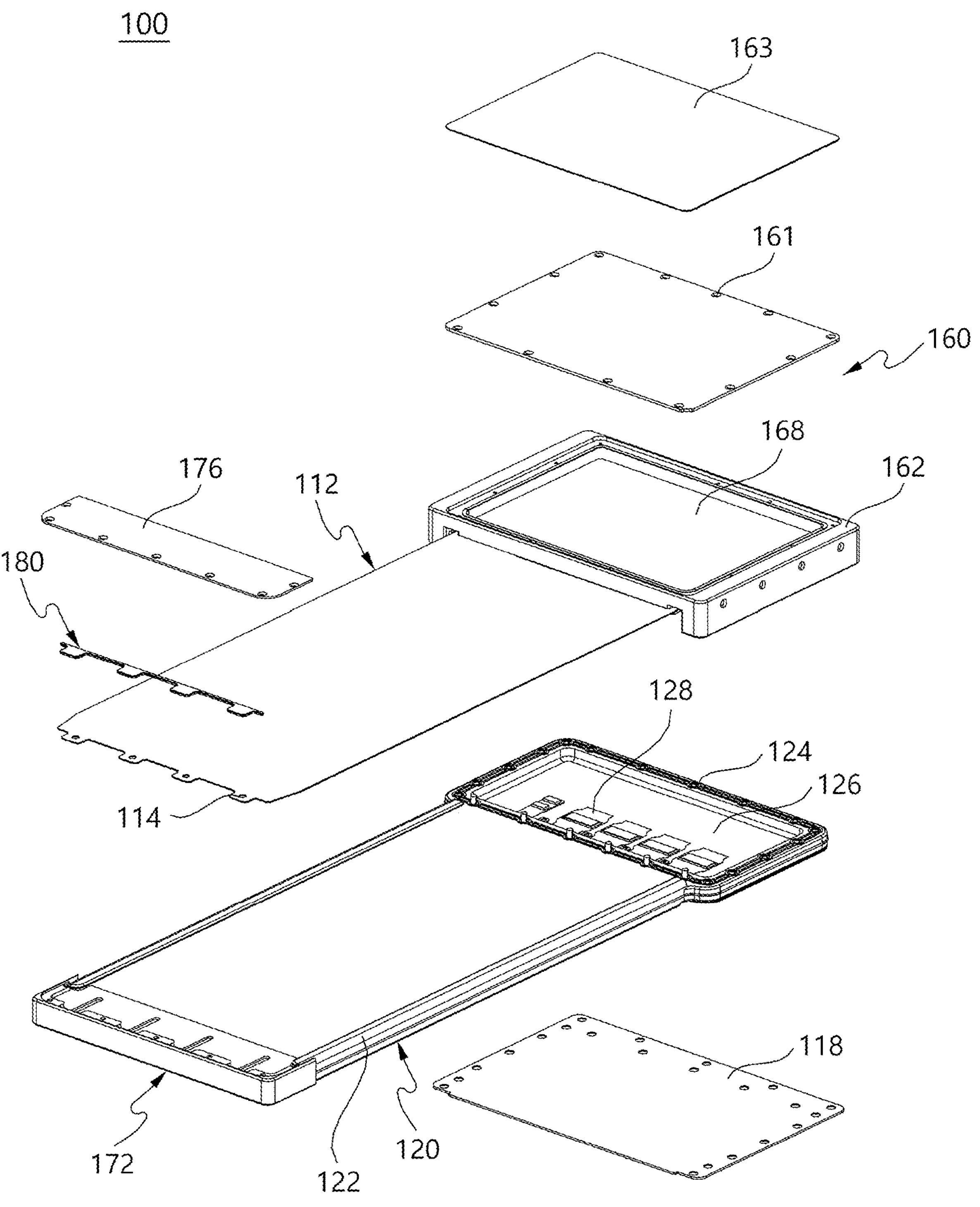
FIG. 18 is an exploded perspective view of the flexible detector according to another embodiment of the present invention.
Figure 19:
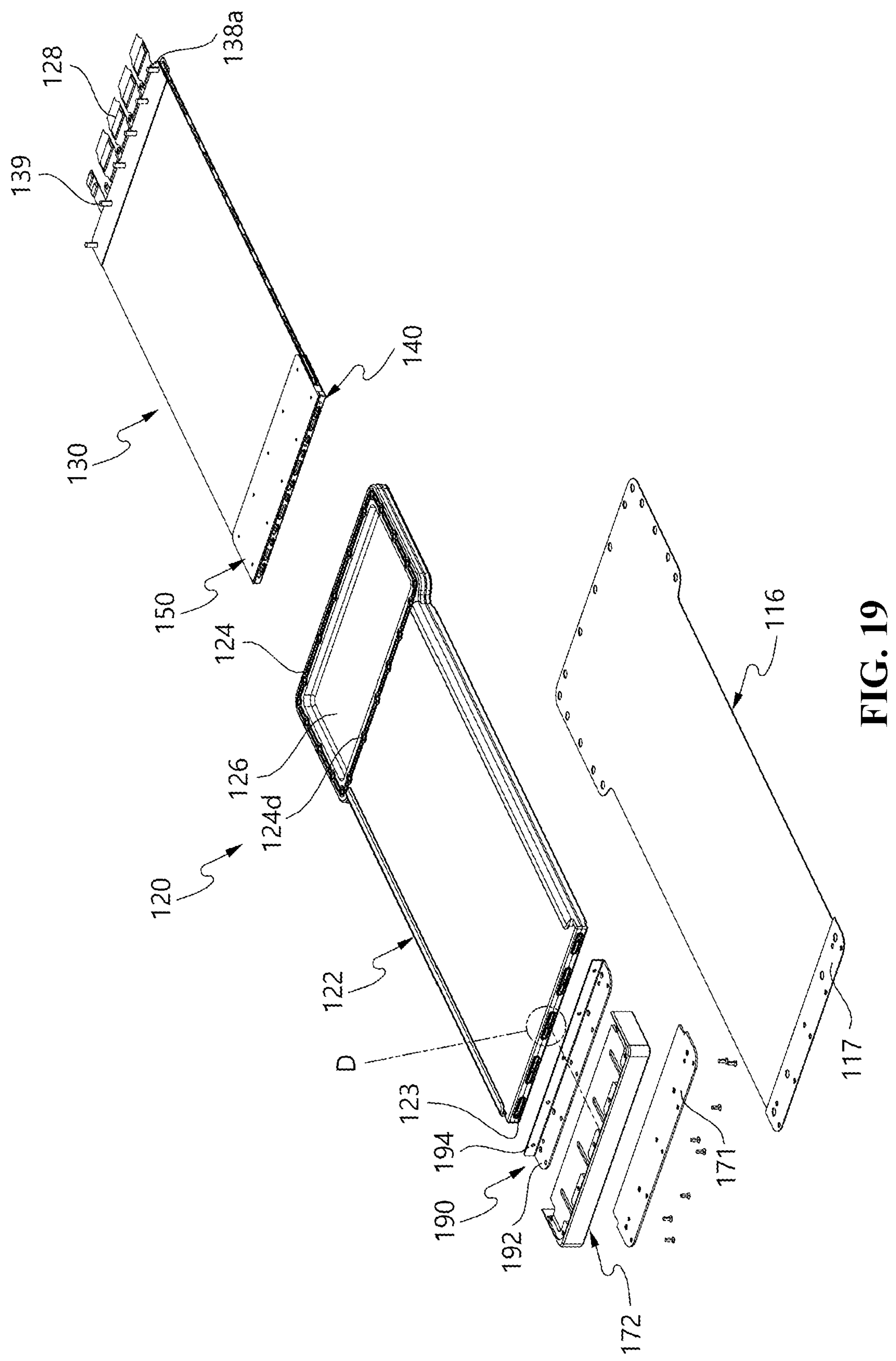
FIG. 19 is an exploded perspective view of a radiation detection part of the flexible detector according to another embodiment of the present invention.

FIG. 17 is a perspective view of a flexible detector according to another embodiment of the present invention, FIG. 18 is an exploded perspective view of the flexible detector according to another embodiment of the present invention, and FIG. 19 is an exploded perspective view of a radiation detection part of the flexible detector according to another embodiment of the present invention.

Because a basic configuration of the flexible detector 100 according to another embodiment of the present invention is identical to the configuration of the flexible detector 1, the common features will be briefly described, or a description thereof will be omitted. A flexible detector 100 according to another embodiment of the present invention includes a flexible panel part 110, a main frame part 160 coupled to one side of the panel part 110, and an end frame part 170 coupled to the other end of the panel part 110.

The panel part 110 may include a radiation detection part 120 and first and second protection panels 112 and 116 respectively provided on a first surface (upper surface) and a second surface (lower surface) of the radiation detection part 120.

The radiation detection part 120 includes a detection panel part 130 including a detection panel 132 therein, and a protection sheath 122 shaped to surround the detection panel part 130. A coupling portion 124 may be formed at one side of the protection sheath 122 and have a first surface side coupled to the main frame part 160, and terminals 128 of the detection panel 132 may be exposed through an opening portion 126 formed in the coupling portion 124.

The main frame part 160 may include a housing 162 and a control module 168 embedded in the housing 162 and have an inner cover 161 and an outer cover 163 that cover an opened side of the main frame part 160. A sealing member for sealing may be provided on close contact surfaces of the inner cover 161 and the housing 162.

The end frame part 170 is coupled to an end of the radiation detection part 120. A first slide structure is formed on the end frame part 70. One side of the first protection panel 112 is fixed to the housing 162 of the main frame part 160, and the other side of the first protection panel 112 is coupled to the end frame part 170. The end frame part 170 includes an end frame main body 172 and an end frame cover 176. The end frame main body 172 and the end frame cover 176 are coupled so that a space is formed therebetween. A stopper 180 is slidably coupled between the end frame main body 172 and the end frame cover 176 in a state in which an end of the first protection panel 112 is supported by using a stopper coupling hole 114 formed at an end of the first protection panel 112. The end frame part 170 may further include a lower cover 171. A fixed end 117 formed at one end of the second protection panel 116 may be fixed between the end frame main body 172 and the lower cover 171.

The detection panel part 130 is provided in the protection sheath 122 of the radiation detection part 120. A coupling piece 138*a* may be provided at one side of the detection panel part 130, and a plurality of fixing rods 139 may protrude from the coupling piece 138*a*. The fixing rods 139 may be inserted into fixing rod insertion holes 124*d* formed in the Y-axis direction in the coupling portion 124 of the protection sheath 122.

An inner end frame 140 and an inner end frame cover 150 are provided at the other end of the detection panel part 130. The other side of the detection panel provided in the detection panel part 130 may be slid by the slide structure between the inner end frame 140 and the inner end frame cover 150. The inner end frame 140 is fixed to the end frame part 170, and the fixing rods 139 are fixedly inserted into the fixing rod insertion holes 124*d*, such that the detection panel may slide in the X-axis direction in the detection panel part 130 accommodated in the protection sheath 122 when the flexible detector 100 is bent.

The flexible detector 100 according to another embodiment of the present invention may further include a connection bracket 190 coupled to an end 123 of the protection sheath 122. The connection bracket 190 may include a first plate 192 coupled to the end frame part 170, and a second plate 194 coupled to the end 123 of the protection sheath 122, and the first plate 192 and the second plate 194 may define an L shape. The connection bracket 190 may seal an opening at a side of the end 123 of the protection sheath 122. In case that the flexible detector 100 accidentally falls and the end frame part 170 comes into contact with the ground surface first, the connection bracket 190 may mitigate an impact applied to the radiation detection part 120.

Figure 20:
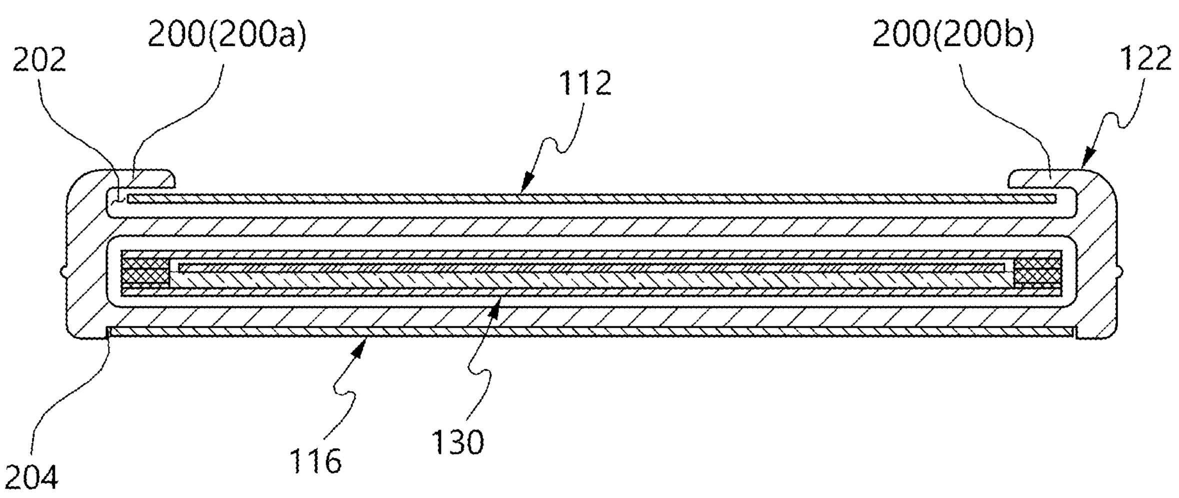
FIG. 20 is a view illustrating a cross-section (cross-section taken along line B-B' in FIG. 17) of a panel part of the flexible detector according to another embodiment of the present invention.

FIG. 20 is a view illustrating a cross-section (cross-section taken along line B-B' in FIG. 17) of a panel part of the flexible detector according to another embodiment of the present invention.

With reference to FIG. 20, the protection sheath 122, which constitutes the flexible detector 100, may have blade portions 200 provided at the first surface side and configured to guide two opposite sides of the first protection panel 112. In the present invention, the first protection panel 112 may slide in the X-axis direction when the flexible detector 100 is bent. A first blade portion 200*a* and a second blade portion 200*b* may be provided at two opposite ends of the first surface side of the protection sheath 122 based on the X-axis direction and bent inward from the outside, and protection panel guide spaces 202 may be formed inside the first blade portion 200*a* and the second blade portion 200*b*, such that the sliding movement of the first protection panel 112 may be guided. The first blade portion 200*a* and the second blade portion 200*b* are illustrated as extending in the X-axis direction from the two opposite ends of the first surface of the protection sheath 122. However, in the embodiment of the present invention, the first blade portions 200*a* and the second blade portions 200*b* may be provided at predetermined intervals in the X-axis direction. In addition, the first blade portion 200*a* and the second blade portion 200*b* are illustrated in shapes that partially cover the two opposite ends of the first protection panel 112. However, the first blade portion 200*a* and the second blade portion 200*b* may extend and cover the entire upper surface of the first protection panel 112. In this case, the guide space 202 defined by the blade portion 200 may have a flat tunnel structure that accommodates the first protection panel 112. Meanwhile, a protection panel coupling surface 204, to which the second protection panel 116 is coupled, may be provided at a second surface side of the protection sheath 122 while defining a stepped portion.

Figure 21:
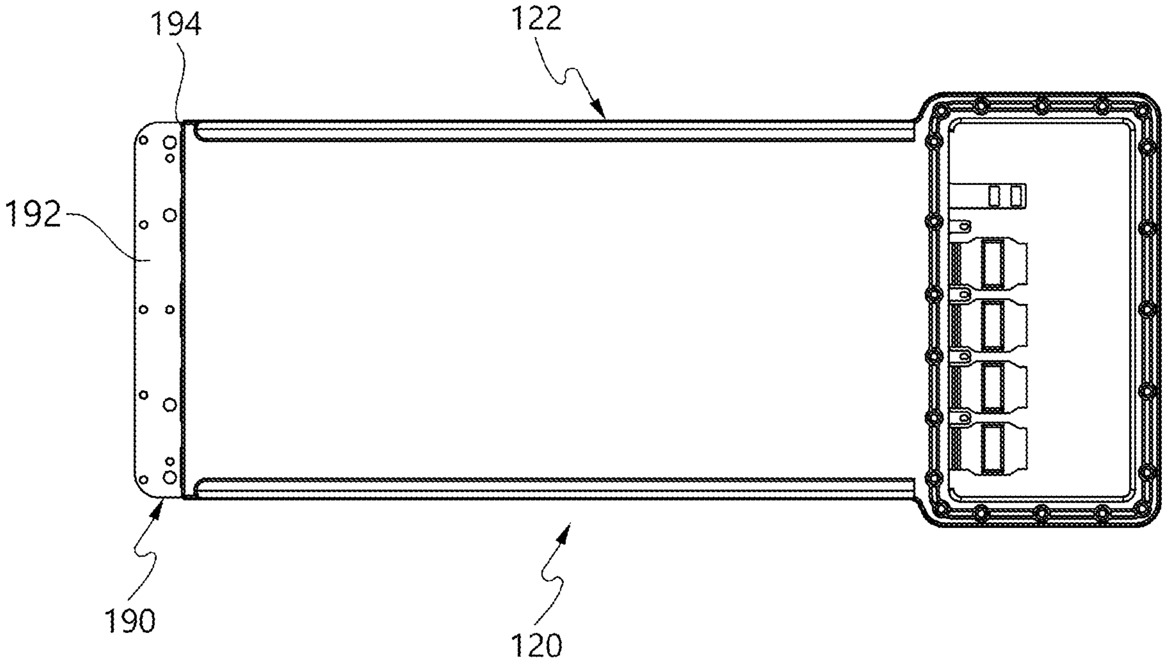
FIG. 21 is a top plan view of the radiation detection part of the flexible detector according to another embodiment of the present invention.
Figure 22:
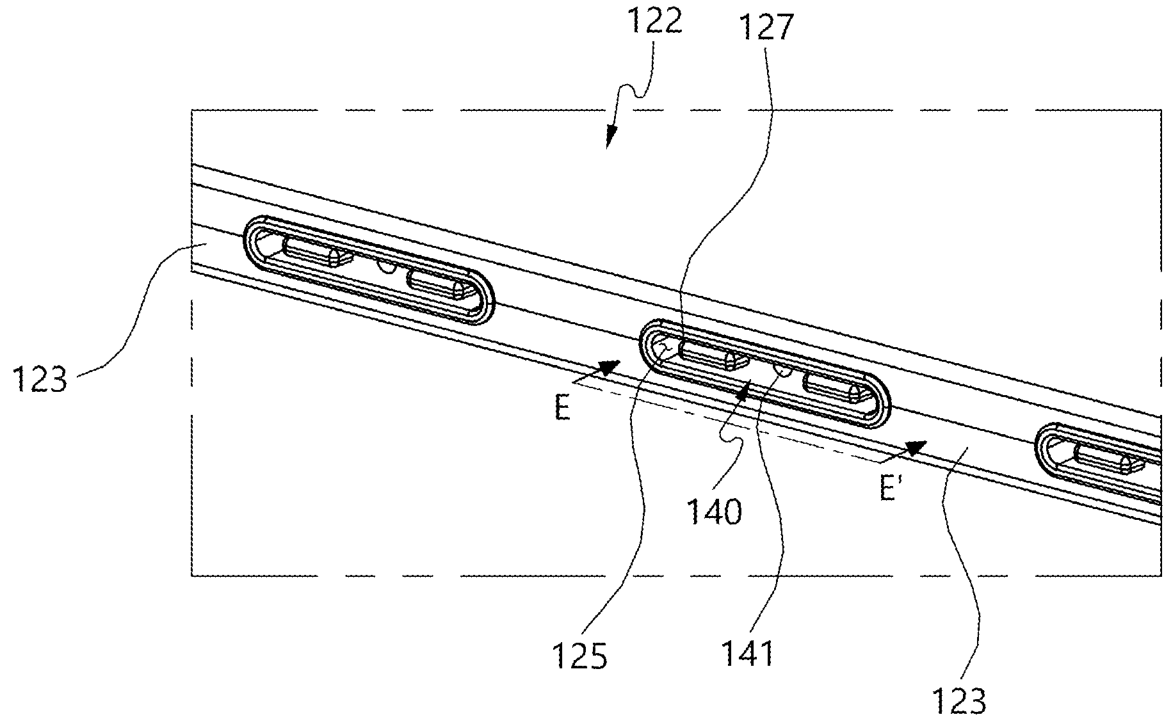
FIG. 22 is a view illustrating one end (part D in FIG. 19) in a state in which a detection panel part is coupled to a protection sheath in the flexible detector according to another embodiment of the present invention.
Figure 23:
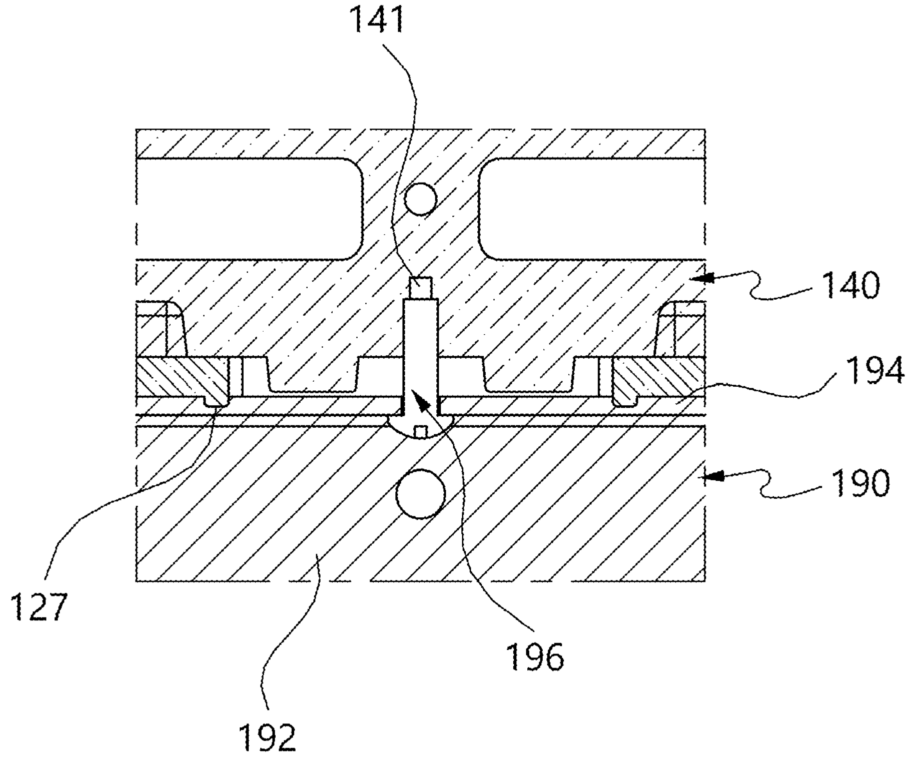
FIG. 23 is a view illustrating a cross-section (cross-section taken along line E-E' in FIG. 22) in a state in which a connection bracket is coupled to an end of the protection sheath of the flexible detector according to another embodiment of the present invention.

FIG. 21 is a top plan view of the radiation detection part of the flexible detector according to another embodiment of the present invention, FIG. 22 is a view illustrating one end (part D in FIG. 19) in a state in which a detection panel part is coupled to a protection sheath in the flexible detector according to another embodiment of the present invention, and FIG. 23 is a view illustrating a cross-section (cross-section taken along line E-E' in FIG. 22) in a state in which a connection bracket is coupled to an end of the protection sheath of the flexible detector according to another embodiment of the present invention.

With reference to FIG. 21, the connection bracket 190 including the first plate 192 and the second plate 194 is coupled to the end 123 of the protection sheath 122 of the radiation detection part 120.

With reference to FIG. 22, an opening 125 may be formed at the end 123 of the protection sheath 122. The inner end frame 140 coupled to the end of the detection panel part 130 may be exposed through the opening 125. Fixing screw holes 141 may be formed in the inner end frame 140. In addition, sealing protrusions 127 may be formed around the opening 125.

With reference to FIG. 23, a fixing screw 196 is inserted through the second plate 194 of the connection bracket 190 and coupled to the fixing screw hole 141 of the inner end frame 140, such that the connection bracket 190 may be fixed to the end 123 of the protection sheath 122. In this case, the sealing protrusion 127 is pressed, such that the opening 125 may be sealed by the second plate 194, and the sealability of the protection sheath 122 may be ensured. In the embodiment, a screw having a waterproof function may be used as the fixing screw 196, and a sealing member, such as a gasket or an O-ring, may also be used together with the sealing protrusion 127 or instead of the sealing protrusion 127. In addition, because the inner end frame 140 is fixed to the end frame part 170 by means of the connection bracket 190, the detection panel may slide in the detection panel part 130 when the flexible detector 100 is bent.

Meanwhile, the configuration has been described in which the connection bracket 190 is coupled to the end 123 of the protection sheath 122, and the sealing protrusion 127 is pressed. However, in the embodiment of the present invention, in case that the connection bracket 190 is not provided, the end 123 of the protection sheath 122 may be coupled directly to the end frame part 170, and the sealing protrusion 127 may be pressed, such that the opening 125 may be sealed.

Figure 24:
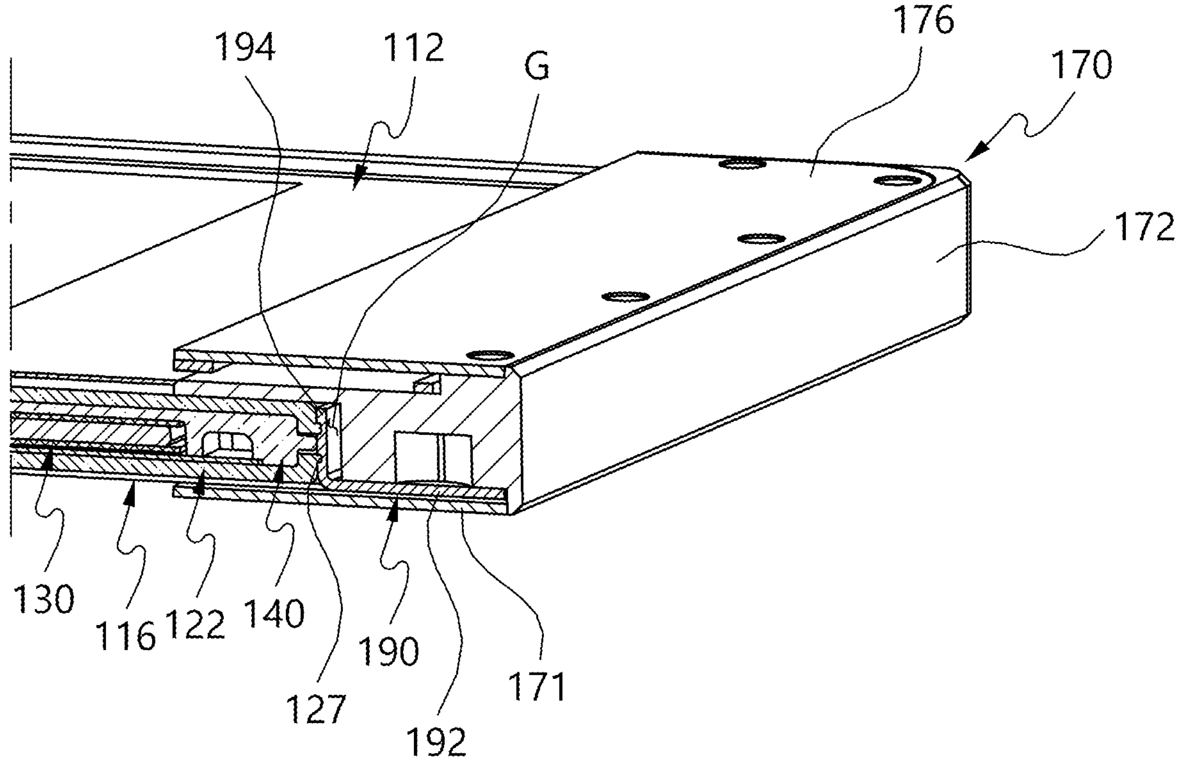
FIG. 24 is a view illustrating a cross-section (cross-section taken along line C-C' in FIG. 17) in a state in which the flexible detector according to another embodiment of the present invention is coupled.

FIG. 24 is a view illustrating a cross-section (cross-section taken along line C-C' in FIG. 17) in a state in which the flexible detector according to another embodiment of the present invention is coupled.

The second plate 194 of the connection bracket 190 is coupled to the end 123 of the protection sheath 122, and the first plate 192 of the connection bracket 190 is coupled between the end frame main body 172 and the lower cover 171 of the end frame part 170. The second plate 194 of the connection bracket 190 presses the sealing protrusion 127 while being fixed to the inner end frame 140 of the detection panel part 130 by the fixing screw 196.

One side of the first protection panel 112 is slidably coupled between the end frame main body 172 and the end frame cover 176, the second protection panel 116 is coupled to the lower surface of the protection sheath 122, and one side of the second protection panel 116 is coupled between the end frame main body 172 and the lower cover 171 of the end frame part 170.

As illustrated in FIG. 24, a gap G may be formed between the second plate 194 of the connection bracket 190 and the end frame main body 172. The gap G and the elasticity of the connection bracket 190 may mitigate an impact applied to the radiation detection part 120 when the flexible detector 100 falls in a state in which the end frame part 170 is directed downward.

Figure 25:
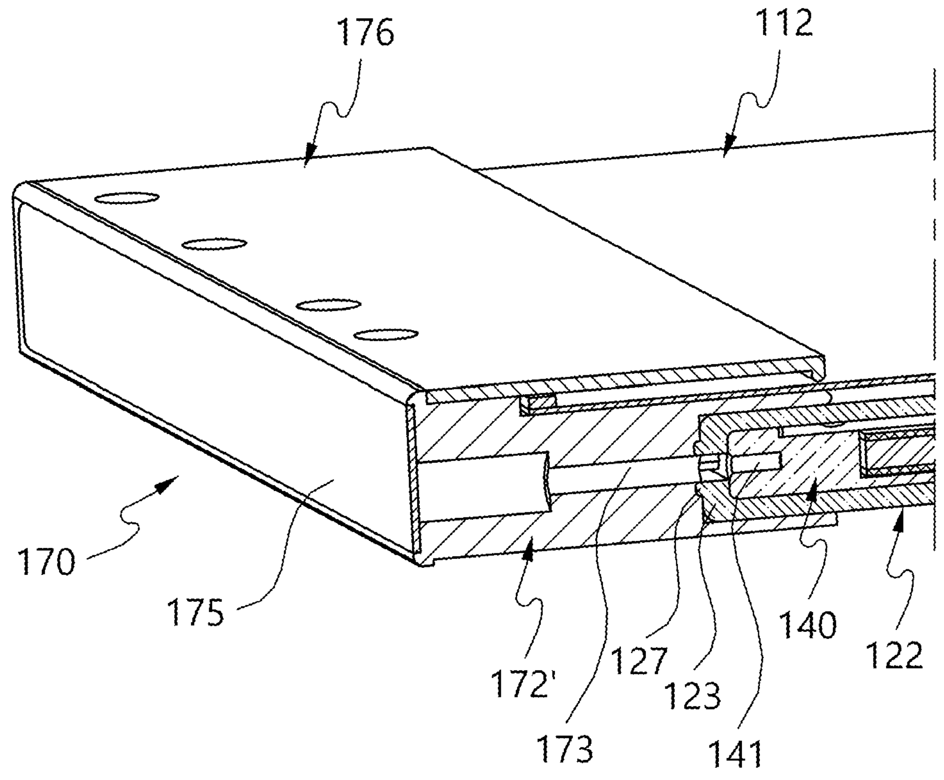
FIG. 25 is a view illustrating another embodiment of an end frame part of the flexible detector according to another embodiment of the present invention.

FIG. 25 is a view illustrating another embodiment of an end frame part of the flexible detector according to another embodiment of the present invention.

In the embodiment illustrated in FIG. 25, the connection bracket 190 is not provided, and the end 123 of the protection sheath 122 is coupled directly to the end frame main body 172 of the end frame part 170. In the embodiment, as illustrated in FIG. 25, a concave accommodation portion is formed in an end frame main body 172', and the end 123 of the protection sheath 122 is inserted into the accommodation portion. The end frame main body 172' has a screw insertion hole 173 formed in a longitudinal direction (X-axis direction in FIG. 17) of the flexible detector 100. A separate fixing screw is inserted through the screw insertion hole 173 and coupled to the fixing screw hole 141 of the inner end frame 140 of the detection panel part 130, such that the end 123 of the protection sheath 122 and the inner end frame 140 may be fixed to the end frame main body 172'. Thereafter, a sealing cover 175 may be attached to a surface through which the screw insertion hole 173 of the end frame main body 172' is exposed, such that the sealability may be maintained.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A flexible detector comprising:

a panel part comprising a detection panel configured to detect radiations, and first and second protection panels respectively disposed at first and second surface sides of the detection panel, the panel part being configured to be deformable;

a main frame part coupled to one side of the panel part; and an end frame part coupled to an end of another side of the panel part, wherein the detection panel, the first protection panel, and the second protection panel extend in a first direction, and wherein a first slide structure is disposed on the end frame part and configured to couple an end of the first protection panel to the end frame part and support the end of the first protection panel such that the end of the first protection panel is slidable in the first direction, or a second slide structure is disposed at an end of the panel part directed toward the end frame part and configured to support an end of the detection panel such that the end of the detection panel is slidable in the first direction.

2. The flexible detector of claim 1, wherein the first slide structure comprises a stopper disposed at the end of the first protection panel, and the stopper is guided to slide in the end frame part.

3. The flexible detector of claim 2, wherein the stopper has a slide protrusion, and the end frame part has a slide guide having a groove shape into which the slide protrusion is inserted and guided.

4. The flexible detector of claim 3, wherein the end frame part comprises:

an end frame main body fixed to the end of the panel part; and an end frame cover coupled to accommodate the stopper between the end frame main body and the end frame cover, and wherein the slide guide is defined on at least one of an upper surface of the end frame main body and a lower surface of the end frame cover.

5. The flexible detector of claim 3, wherein the stopper is coupled to the end of the first protection panel, a stopper coupling hole, into which the slide protrusion is inserted, is provided at the end of the first protection panel, and the stopper is coupled to the end of the first protection panel.

6. The flexible detector of claim 2, wherein a maximum movement range of the stopper is restricted by the first slide structure.

7. The flexible detector of claim 1, wherein one side of the first protection panel is fixed to the main frame part, one side of the second protection panel is fixed to the main frame part with the panel part interposed therebetween, and another side of the second protection panel is fixed to the end frame part.

8. The flexible detector of claim 1, wherein the second slide structure comprises:

a slide panel to which the end of the detection panel is coupled; and an inner end frame part disposed at the end of the detection panel and configured to support the slide panel such that the slide panel is slidable.

9. The flexible detector of claim 8, wherein the panel part comprises:

the detection panel;

first and second inner protection panels respectively disposed on first and second surfaces of the detection panel; and a detection panel part comprising the inner end frame part.

10. The flexible detector of claim 9, wherein the panel part comprises:

the detection panel part; and a radiation detection part having a protection sheath configured to accommodate the detection panel part and the inner end frame part.

11. The flexible detector of claim 10, wherein the end frame part is coupled to an end of the protection sheath of the radiation detection part.

12. The flexible detector of claim 9, wherein the second slide structure comprises a guide protrusion protruding from the inner end frame part, and the inner end frame part, the first inner protection panel, and the second inner protection panel have slide long holes penetrated by the guide protrusion.

13. The flexible detector of claim 12, wherein the inner end frame part comprises:

an inner frame main body having the guide protrusion; and an inner frame cover coupled to the inner frame main body.

* * * * *